(12) United States Patent
Takeuchi et al.

(10) Patent No.: US 9,441,762 B2
(45) Date of Patent: Sep. 13, 2016

(54) CABLE GUIDE APPARATUS

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

(*) Notice: Subject to any disclaimer, the term of this patent is extended or adjusted under 35 U.S.C. 154(b) by 0 days.

(21) Appl. No.: 14/607,175

(22) Filed: Jan. 28, 2015

(65) Prior Publication Data

US 2016/0215901 A1 Jul. 28, 2016

(51) Int. Cl.
| | | |
|---|---|---|
| *F16L 3/22* | (2006.01) | |
| *F16L 3/08* | (2006.01) | |
| *G02B 6/44* | (2006.01) | |
| *H02G 3/08* | (2006.01) | |
| *H02G 3/36* | (2006.01) | |

(52) U.S. Cl.
CPC ............ *F16L 3/08* (2013.01); *G02B 6/4446* (2013.01); *G02B 6/4461* (2013.01); *H02G 3/083* (2013.01); *H02G 3/36* (2013.01)

(58) Field of Classification Search
CPC ......... H02B 1/36; F16L 3/08; G02B 6/4461; G02B 6/4446; G02B 6/4452; H02G 3/36; H02G 3/083; H02G 11/00; H02G 11/006; H05K 7/14
USPC ................. 312/223.6, 223.2, 273; 248/68.1
See application file for complete search history.

(56) References Cited

U.S. PATENT DOCUMENTS

| | | | |
|---|---|---|---|
| 2,865,979 A | | 12/1958 | Klassen |
| 4,600,173 A | * | 7/1986 | Frascaroli .............. A47B 17/00 248/228.6 |
| 4,688,885 A | | 8/1987 | Poteat et al. |
| 5,613,021 A | | 3/1997 | Saito et al. |
| 5,775,755 A | | 7/1998 | Covert et al. |
| 6,327,139 B1 | | 12/2001 | Champion et al. |

(Continued)

FOREIGN PATENT DOCUMENTS

| | | |
|---|---|---|
| EP | 0207926 A2 | 1/1987 |
| EP | 0795935 A2 | 9/1997 |

OTHER PUBLICATIONS

Partial International Search Report for Application No. PCT/US2013/023176 dated May 2, 2013.

(Continued)

*Primary Examiner* — Mark Wendell
(74) *Attorney, Agent, or Firm* — Lerner, David, Littenberg, Krumholz & Mentlik, LLP

(57) ABSTRACT

A cable guide apparatus includes a first longitudinal channel defined by first, second, and third walls, the third wall toward and away from the first. The second and third walls may have a plurality of openings to facilitate bending of the longitudinal channel and any cables secured therein. The first wall may include a plurality of closure mechanisms, such as hooks, and the third wall may include a plurality of closure mechanisms, such as lips. The cable guide apparatus has an open condition in which cables may easily be inserted into the channel, and a closed condition in which the cables are secured in the channel. The width of the openings may define a maximum amount the cable guide apparatus may bend, such that cables secured within the apparatus do not bend to the point of being damaged.

16 Claims, 19 Drawing Sheets

(56) References Cited

U.S. PATENT DOCUMENTS

| | | | |
|---|---|---|---|
| 6,356,697 B1 | 3/2002 | Braga et al. | |
| 6,437,243 B1* | 8/2002 | VanderVelde | H02G 3/0418 174/101 |
| 6,972,367 B2* | 12/2005 | Federspiel | H02G 3/0418 174/481 |
| 7,335,056 B1 | 2/2008 | Clark et al. | |
| 7,459,633 B2* | 12/2008 | Burns | H02G 3/0418 138/168 |
| 7,593,217 B2* | 9/2009 | Shahrokhi | F16G 13/16 248/317 |
| 7,663,060 B2* | 2/2010 | Nelson | H04Q 1/10 174/101 |
| 7,746,667 B1 | 6/2010 | Baiza et al. | |
| 8,068,715 B2 | 11/2011 | Kewitsch | |
| 8,175,425 B2 | 5/2012 | Chen | |
| 8,217,266 B2* | 7/2012 | Caveney | H02G 3/0418 174/70 C |
| 8,731,361 B2 | 5/2014 | Anderson et al. | |
| 8,939,792 B2* | 1/2015 | Takeuchi | H01R 13/58 439/571 |
| 2002/0117942 A1 | 8/2002 | Audibert et al. | |
| 2004/0074852 A1 | 4/2004 | Knudsen et al. | |
| 2006/0018622 A1 | 1/2006 | Caveney et al. | |
| 2006/0080933 A1* | 4/2006 | Robicheau | F16L 3/22 52/712 |
| 2006/0162948 A1 | 7/2006 | Rinderer et al. | |
| 2008/0002937 A1 | 1/2008 | Spisany et al. | |
| 2009/0078834 A1 | 3/2009 | Chen et al. | |
| 2009/0086441 A1 | 4/2009 | Randall et al. | |
| 2010/0008623 A2 | 1/2010 | Arol et al. | |
| 2010/0054659 A1 | 3/2010 | Pnini et al. | |
| 2010/0310221 A1 | 12/2010 | Le Dissez | |
| 2010/0310225 A1 | 12/2010 | Anderson et al. | |
| 2012/0019117 A1 | 1/2012 | Dunwoody et al. | |
| 2012/0321255 A1 | 12/2012 | Kewitsch | |
| 2013/0196538 A1 | 8/2013 | Takeuchi et al. | |
| 2014/0348481 A1* | 11/2014 | Giraud | G02B 6/3825 385/135 |
| 2014/0355217 A1 | 12/2014 | Takeuchi et al. | |

OTHER PUBLICATIONS

International Search Report for Application No. PCT/US2013/023176 dated Jun. 27, 2013.
Partial International Search Report for Application No. PCT/US2013/033701 dated Jul. 11, 2013.
International Search Report and Written Opinion for Application No. PCT/US2013/033701 dated Sep. 2, 2013.
International Search Report and Written Opinion for Application No. PCT/US2014/021953 dated Jun. 25, 2014.

* cited by examiner

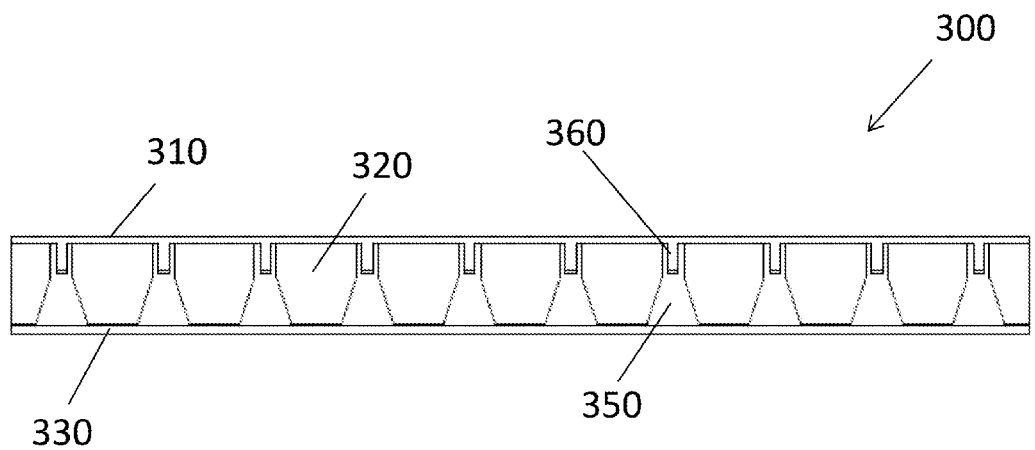
*FIG. 4C*
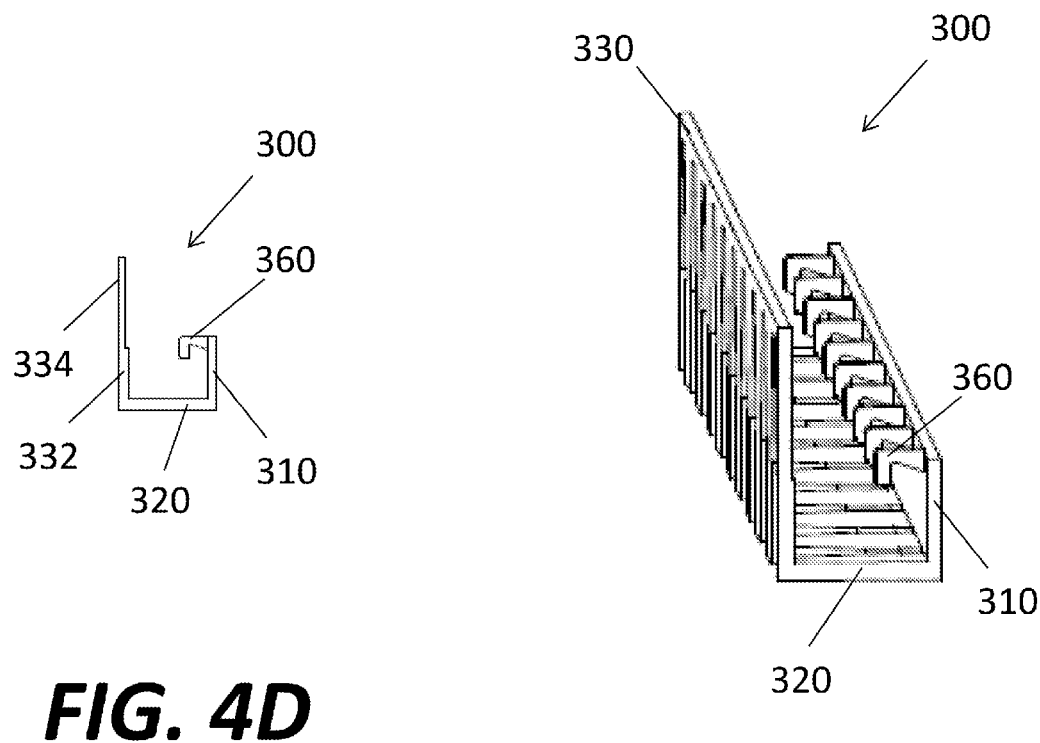
*FIG. 4D*
*FIG. 4E*

CABLE GUIDE APPARATUS

BACKGROUND

The present disclosure generally relates to a device and a system for guiding, supporting, and managing cables. More particularly, the present disclosure relates to apparatus for managing cables of communication patch panel devices and systems.

In communications cabinets and racks, a multitude of cables are interconnected to one another through connectors, e.g., adapters. A cable organization unit typically has a tray or a shelf or a similar platform, which supports the connectors, e.g., adapters. Examples of cable organization units include patch panels.

A patch panel houses cable connectors and in many cases is rack mounted. The patch panel typically is two-sided; the front of the patch panel provides for connections to relatively short wires or cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. It is desirable to provide patch panels having increased connector port density, i.e., the number of locations or ports per unit volume of area for providing connections. To this end, smaller sized connectors are increasingly being utilized.

A variety of optical fiber connectors are available, with the Subscriber Connector (SC) and the Lucent Connector (LC) being the most common. The differences among the types of connectors include dimensions and methods of mechanical coupling. For instance, SC connectors use a round 2.5 mm ferrule to hold a single fiber and use a push-on/pull-off mating mechanism. The ferrule of an LC connector is half the size as that of an SC connector, measuring only 1.25 mm. LC connectors use a retaining tab mechanism, which is similar to that found on a household phone connector.

In data communication and telecommunication applications, small connectors, e.g., LC, are increasingly replacing traditional connectors, e.g., SC. The main advantage of small connectors over larger sized connectors is the ability to provide a higher number of fibers per unit of rack space. Since the LC connector is roughly half the size as the SC connector, the placement of almost twice the number of connectors is possible within the same amount of space by using the LC connector instead of the SC connector.

However, there are disadvantages associated with using smaller connectors. As more connectors are placed within the same amount of space, a higher density of cables may result. With a greater number of cables, particularly when cables are connected to moving parts, better cable management systems are preferred to facilitate use of the patch panel system.

BRIEF SUMMARY

According to one aspect of the disclosure, a cable guide apparatus comprises a first wall portion, a second wall portion, and a third wall portion defining a first longitudinal channel. The first and third wall portions are movable relative to each other, and the third wall portion defines a plurality of openings. A plurality of first closure mechanisms are on the first wall portion, and a plurality of second closure mechanisms are on the third wall portion corresponding to the plurality of first closure mechanisms on the first wall portion and are configured to engage with the plurality of first closure mechanisms on the first wall portion. The cable guide apparatus has an open condition in which the plurality of first closure mechanisms are spaced apart from the plurality of second closure mechanisms, and a closed condition in which at least some of the plurality of first closure mechanisms engage at least some of the plurality of second closure mechanisms. When in the closed condition, the channel is substantially circumferentially enclosed at a plurality of positions along a length of the first longitudinal channel, and in the open condition, the channel is substantially circumferentially open along the length of the first longitudinal channel.

The first wall portion may be substantially orthogonal to the second wall portion, and the second wall portion may be substantially orthogonal to the third wall portion. The third wall portion may include a first portion thicker than a second portion thereof, and the second portion may be coupled to the first portion at a transition point of the third wall portion forming a hinge. The plurality of openings may extend from the third wall portion to the second wall portion. The first closure mechanisms may be hooks and the second closure mechanisms may be lips of the third wall portion. The first closure mechanisms may be protrusions having a first width and second width larger than the first width, and the second closure mechanisms may define apertures having a third width smaller than the second width. The first wall portion, second wall portion, and third wall portion are bendable such that the first longitudinal channel has a bending radius. The first longitudinal channel may have a minimum bending radius defined at least in part by a width of the plurality of openings in the third wall portion. The above-described cable guide apparatus may be incorporated into a cable guide housing system that also includes a housing and a tray moveably coupled to the housing. A first end portion of the cable guide apparatus may be coupled to a static or movable portion of the system and a second end portion of the cable guide apparatus may be coupled to a portion of the movable tray. The bending radius of the cable guide apparatus may change as the tray moves with respect to the housing. The tray may have a pushed in condition and a pulled out condition, the bending radius of the cable guide apparatus having a minimum value when the tray is in the pushed in condition.

According to another aspect of the disclosure, a cable guide assembly comprises a first cable guide apparatus and a second cable guide apparatus. The first cable guide apparatus includes a first wall portion, a second wall portion, and a third wall portion defining a first longitudinal channel, the first and third wall portions being movable relative to each other, wherein the third wall portion defines a plurality of openings. A plurality of first closure mechanisms are on the first wall portion, and a plurality of second closure mechanisms are on the third wall portion corresponding to the plurality of first closure mechanisms on the first wall portion and are configured to engage with the plurality of first closure mechanisms on the first wall portion. The first cable guide apparatus has a first open condition in which the plurality of first closure mechanisms are spaced apart from the plurality of second closure mechanisms, and a first closed condition in which at least some of the plurality of first closure mechanisms engage at least some of the plurality of second closure mechanisms. In the first closed condition, the channel is substantially circumferentially enclosed at a plurality of positions along a length of the first longitudinal channel, and in the first open condition, the first channel is substantially circumferentially open along the length of the first longitudinal channel. The second cable guide apparatus comprises a fourth wall portion, a fifth wall portion, and a sixth wall portion defining a second longitudinal channel, the fourth and sixth wall portions being movable relative to each other, wherein the sixth wall portion defines a plurality of openings. A plurality of third closure mechanisms are on the fourth wall portion, and a plurality of fourth closure mechanisms are on the sixth wall portion corresponding to the plurality of third closure mechanisms on the fourth wall portion and are configured to engage with the plurality of third closure mechanisms on the fourth wall portion. The second cable guide apparatus has a second open condition in which the plurality of third closure mechanisms are spaced apart from the plurality of fourth closure mechanisms, and a second closed condition in which at least some of the plurality of third closure mechanisms engage at least some of the plurality of fourth closure mechanisms. In the second closed condition, the second channel is substantially circumferentially enclosed at a plurality of positions along a length of the second longitudinal channel, and in the second open condition, the second channel is substantially circumferentially open along the length of the second longitudinal channel.

The first wall portion of the first cable guide apparatus may be coupled to the fourth wall portion of the second cable guide apparatus. The first wall portion of the first cable guide apparatus may alternately be integral with the fourth wall portion of the second cable guide apparatus. The first wall portion, second wall portion, and third wall portion may be bendable such that the first longitudinal channel has a bending radius, and the fourth wall portion, fifth wall portion, and sixth wall portion may be bendable such that the second longitudinal channel has a bending radius. The first longitudinal channel may have a first minimum bending radius defined at least in part by a width of the plurality of openings in the third wall portion and the second longitudinal channel may have a second minimum bending radius defined at least in part by a width of the plurality of openings in the sixth wall portion. When the first longitudinal channel is bent to the first minimum bending radius, the bending radius of the second longitudinal channel may be greater than the first minimum bending radius. When the second longitudinal channel is bent to the second minimum bending radius, the bending radius of the first longitudinal channel may be greater than the second minimum bending radius. The above-described cable guide assembly may be incorporated into a cable guide housing system that includes housing, and a tray moveably coupled to the housing. A first end portion of the cable assembly may be coupled to a static or movable portion of the system and a second end portion of the cable guide assembly may be coupled to a portion of the movable tray. As the tray moves with respect to the housing, the first bending radius and the second bending radius may each change.

BRIEF DESCRIPTION OF THE DRAWINGS

By way of description only, embodiments of the present disclosure will be described herein with reference to the accompanying drawings, in which:

FIG. 4C is a top view of the cable guide of FIG. 4A;

FIG. 4D is a side view of the cable guide of FIG. 4A;

FIG. 4E is a side perspective view of the cable guide of FIG. 4A;

DETAILED DESCRIPTION

Figure 1A:
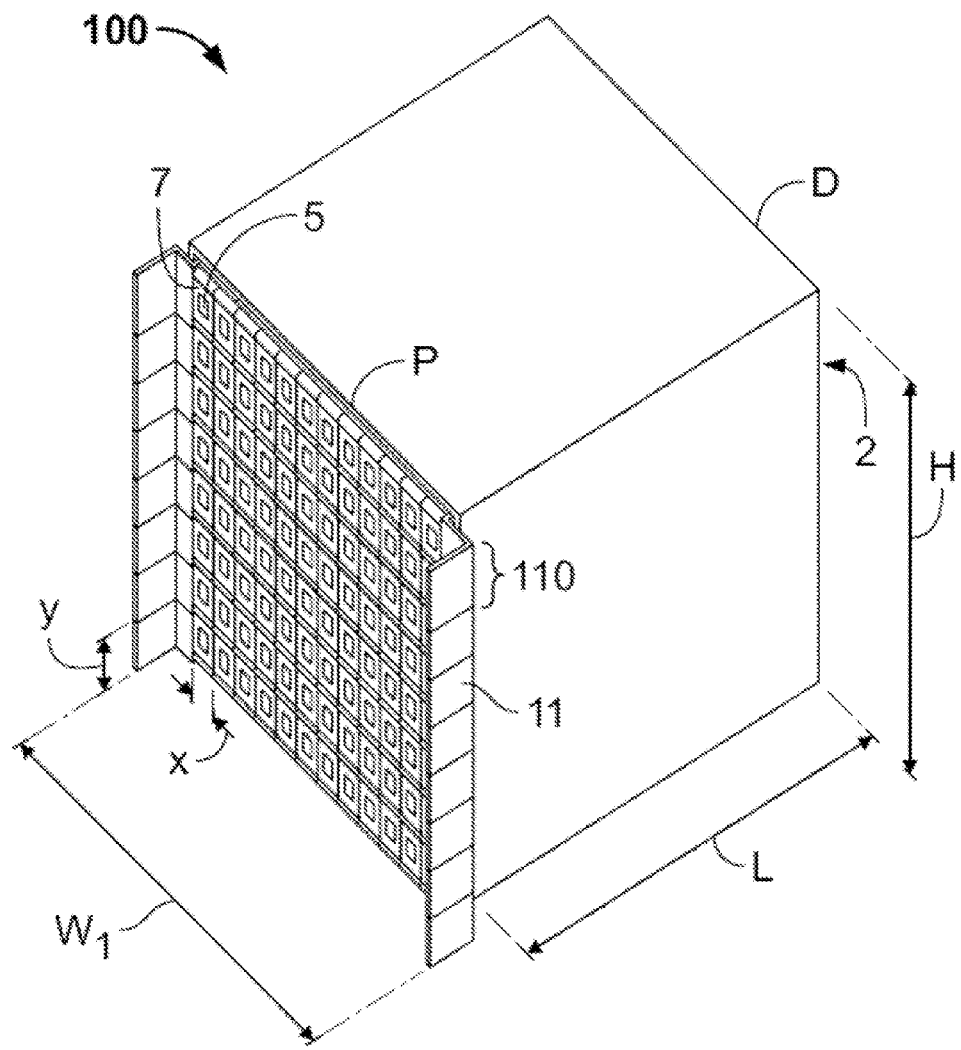
FIG. 1A is a front perspective view of a communication patching system including multiple patch panel devices shown in a first state.

Particular embodiments of the present disclosure are described with reference to the accompanying drawings. In the figures and in the description that follow, in which like reference numerals identify similar or identical elements, the term "proximal" refers to the end of the device that is closest to the operator or user during use, while the term "distal" refers to the end of the device that is farther from the operator or user during use.

Figure 1B:
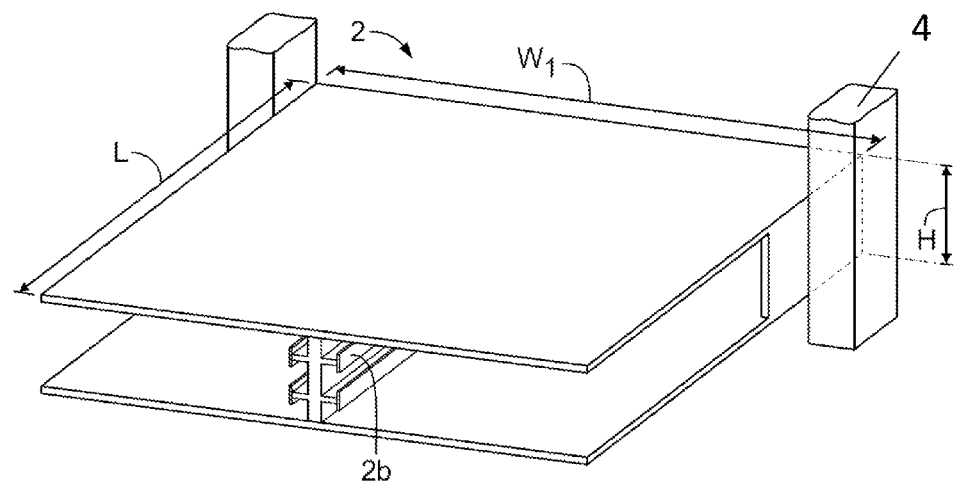
FIG. 1B is a front perspective view of a housing and rack pole, without a patch panel device placed therein.

One embodiment of a communication patching system 100 is illustrated in FIG. 1A. System 100 may include a housing 2, e.g., a rack or a cabinet. The housing 2 may define a length L, a height H, and a width $W_1$. The housing 2 may support one or more patch panel devices 110, with each device 110 held in vertical alignment with a guide rail 2b (FIG. 1B), a plurality of which may also be disposed in vertical alignment along at least one side of the housing 2. A rack pole 4 may be positioned adjacent to the housing 2, typically at a distal corner. The pole 4 may be configured to receive therein a plurality of cables (not shown) extending vertically therethrough. A plurality of spools (not illustrated) may be disposed vertically along the pole 4, such that one spool is positioned adjacent to each patch panel device 110 that may be stored in the housing 2. In one embodiment, the cables may extend vertically through the pole 4 to a first spool, and then to a first patch panel device 110 in the housing 2 corresponding to the first spool.

Each patch panel device 110 may include a plurality of adapters or ports 7, each port 7 having a receptacle 5 for securing a cable therein. The receptacle 5 of the port 7 may be operatively coupled to one or more cables, e.g., the receptacle 5 may be in a simplex or in a duplex configuration.

The patch panel device 110 may include a tab 11 on either end of the patch panel device 110 to facilitate a user grasping or handling of the patch panel device 110. The density of the number of ports 7 supported by the housing 2 may be a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width $W_1$.

The communication patching system 100 may be transitionable between a first state and a second state. In the first state, the one or more patch panel devices 110 may be positioned at a first location with respect to the proximal end or face P of the housing 2. As shown in FIG. 1A, the patch panel devices 110 may be substantially flush with respect to the face P of the housing 2. In the second state, one or more of the patch panel devices 110 may be moved proximally in the direction away from both the proximal end or face P of the housing 2 and the distal end or face D of the housing 2. As the patch panel device 110 is moved proximally, the ports 7 may become more accessible to the user. Patch panel systems and devices are described in greater detail in U.S. Patent Publication Nos. 2014/0355217, 2014/0357118, 2014/0354131, and 2014/0376870, the disclosures of which are hereby incorporate by reference herein.

Figure 2:
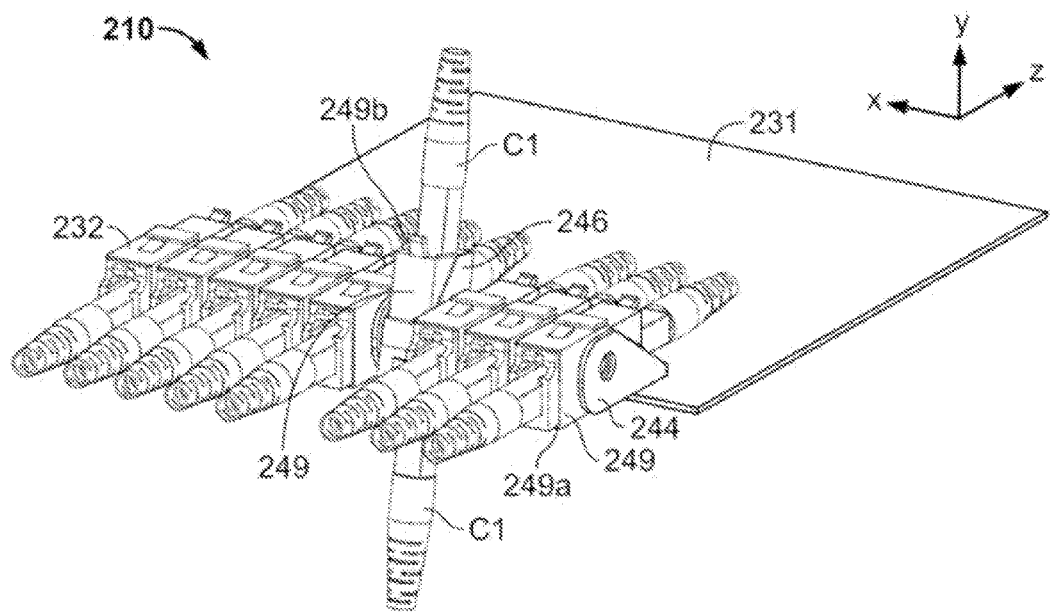
FIG. 2 is a perspective view of another embodiment of a patch panel device including a plurality of attachment members.

Various types of patch panel devices may be used in a patch panel system of similar construction to system 100. For example, another embodiment of a patch panel device is described with reference to FIG. 2. A patch panel device 210 may include a plurality of attachment members 232 that are positioned adjacent to one another. Each attachment member 232 may include a movable member 246, which is rotatable or pivotable relative to a movable member of another attachment member 232. The movable members 246 of adjacent members 232 may be operatively coupled to one another to permit rotation of one of the movable members 246 relative to the other movable member. In an embodiment, the movable members 246 may be coupled to one another in a snap-fit connection that permits radial movement of the movable members 246 relative to one another. At least two securement members 244 may be secured to opposing ends of the plurality of attachment members 232 and secure the attachment members 232 to a tray 231. In another embodiment, a securement member 244 may be positioned between each of the movable members 246. Each of the movable members 246 may be operatively coupled to one or more cables C1, which are shown only in part. The movable member 246 may include a cable adapter or connector 249, which may include a front surface 249a that may be operatively coupled to one cable C1 and a back surface 249b that may be operatively coupled to another cable C1. The movable member 246 may include a receptacle in which the connector 249 may be releasably secured such that the connector 249 may be separated from the attachment member 232.

A plurality of patch panel devices 210 may also be supported within housing 2 (see FIGS. 1A-B), and may be translatable into or out from the housing 2. Once spaced apart from the housing 2, the movable member 246 may be pivoted with respect to the securement member 244, thereby spacing the surfaces 249a, 249b of the connector 249 from any adjacent connector 249 such that the cables C1 may be more accessible and readily grasped by a user to detach the cable C1 from the cable adapter or connector 249 of the movable member 246. Patch panel device 210 is described in greater detail in U.S. Patent Application No. 2014/0355217, the disclosure of which is hereby incorporated by reference herein.

Figure 3A:
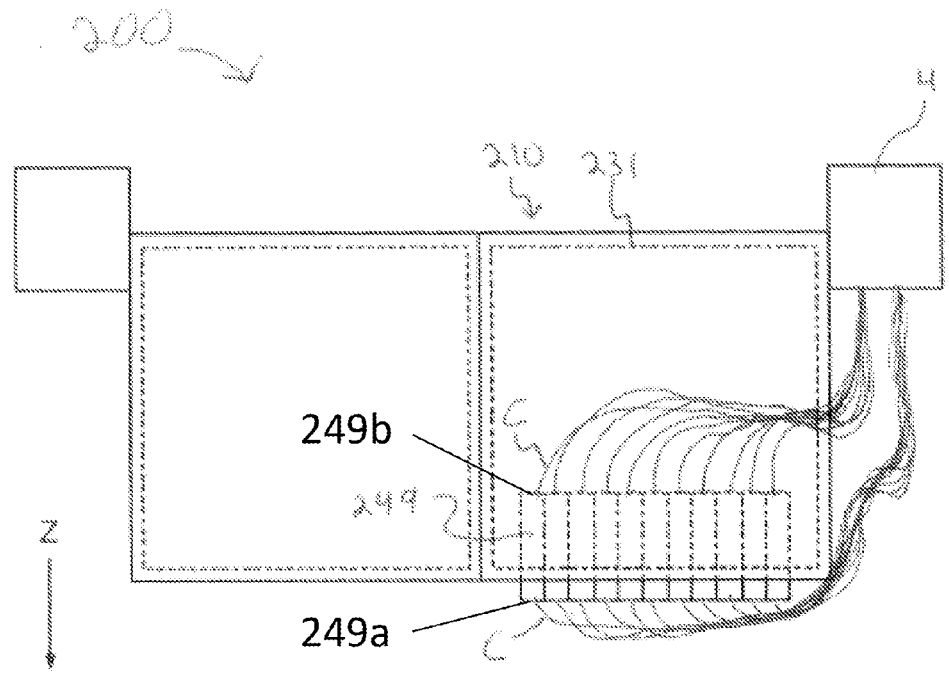
FIG. 3A is a top cutaway view of a patch panel system with a tray in a closed position.
Figure 3B:
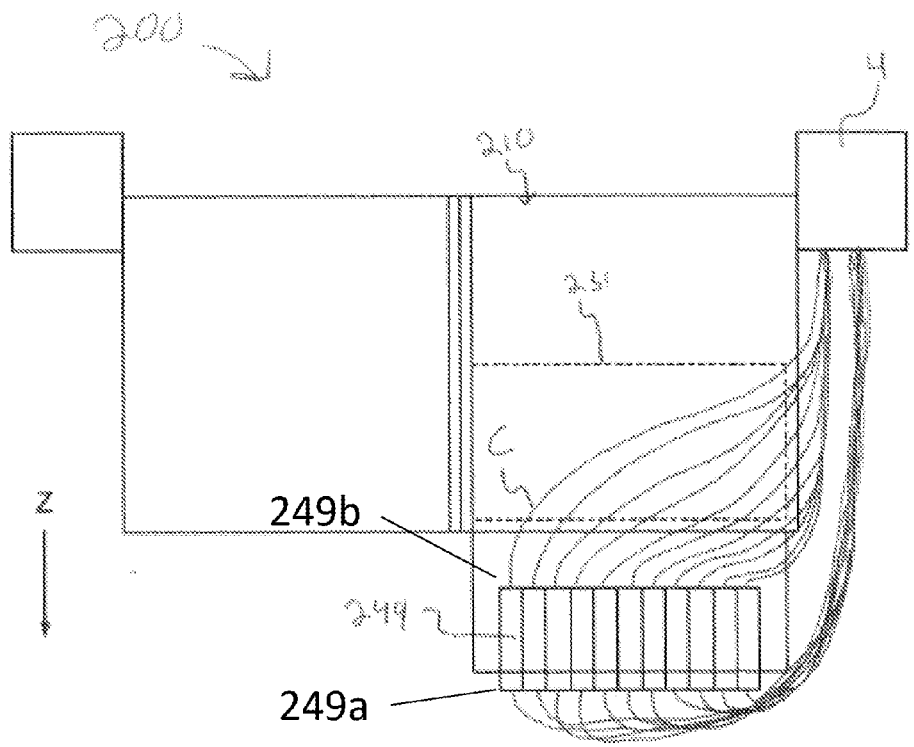
FIG. 3B is a top cutaway view of the patch panel system of FIG. 3A with the tray in an open position.

For example, a patch panel system 200 incorporating a plurality of patch panel devices 210 is illustrated in FIGS. 3A-B. In this example, the housing includes a first set of patch panel devices 210 stacked vertically adjacent to a second set of patch panel devices 210 also stacked vertically, although details of only one of the sets of patch panel devices 210 are illustrated in FIGS. 3A-B. A first plurality of cables C extend from rack pole 4 to a back surface 249b of cable connector 249 and a second plurality of cables C extend from rack pole 4 to a front surface 249a of cable connector 249. As the number of cables C connected to a patch panel device 210 increases, so does the potential for the cables C becoming disorganized or tangled with one another, which may make the use of patch panel system 200 more difficult or cause undesired mechanical stresses on the cables, such as may occur from bending of the cables, or on other components in the system 200. Further, because patch tray 231 of patch panel device 210 may be pulled out proximally (FIG. 3B), cables C should be long enough to extend from rack pole 4 to cable connectors 249 when tray 231 is in the pulled out condition. This additional length may even further increase the likelihood that cables C may become disorganized or tangled to cause mechanical stresses thereon by bending of the cables, particularly when in the pushed in condition (FIG. 3A). Still further, the lack of organization of cables C may lead to damage of cables C, for example if the cable is caught on an edge of tray 231 as it is translated into or out of the housing of system 200

A cable guide 300 as illustrated in FIGS. 4A-5D may be used in a cable management system, such as in a patch panel system similar to the system 200, to maintain organization of cables C and avoid undesirable mechanical stress on the cables. In particular, cable guide 300 is illustrated in an open condition in FIGS. 4A-E. Cable guide 300 may include a first wall 310, a second wall 320, and a third wall 330. The three walls may define a channel along a longitudinal axis of the cable guide 300, the channel being configured to accept one or more cables C therein. When in the open condition, first wall 310 and third wall 330 may be substantially parallel to one another and each may form a substantially right angle with second wall 320. Third wall 330 may have a height that is greater than a height of first wall 310 when in the open condition. As shown best in FIG. 4D, third wall 330 may include a first portion 332 and a second portion 334, with the first portion 332 being thicker than the second portion 334 to form a hinge and to facilitate bending of the second portion 334 relative to the first portion 332. The wall 330 may be configured to be normally planar, such that a force needs to be applied to a portion thereof, such as the second portion 334, to cause bending of one end of the wall 330 relative to the other opposing end. The three walls may be formed from an elastic material, such as rubber or polyurethane, for example.

A plurality of openings or cutouts 350 may be formed along one or both of second wall 320 and third wall 330. Preferably, first wall 310 is substantially continuous without any cutouts. In the illustrated embodiment, cutouts 350 extend from the second wall 320 to the third wall 330, the cutouts 350 being defined by both the second wall 320 and the third wall 330. Cutouts 350 may extend along third wall 350 to form a relatively thin lip 336 adjacent the top of each cutout 350. Alternately, more or fewer cutouts 350 may be formed than shown, and cutouts 350 may be formed fully within only the second wall 320 or fully within the third wall 330. Cutouts 350 are illustrated as being substantially triangular or trapezoidal, but other shapes may be suitable. Cutouts 350 may facilitate bending of guide 300, as described in greater detail below with reference to FIGS. 8A-E. A plurality of protrusions, such as hooks 360, may extend from first wall 310 toward third wall 330.

Figure 4A:
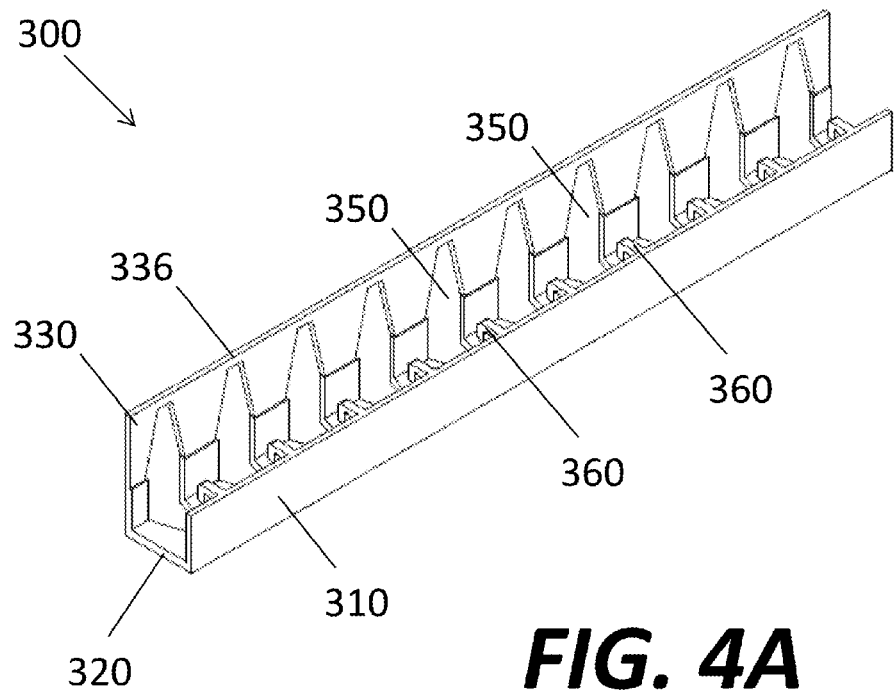
FIG. 4A is a front perspective view of a cable guide in an open condition according to an aspect of the disclosure.
Figure 4B:
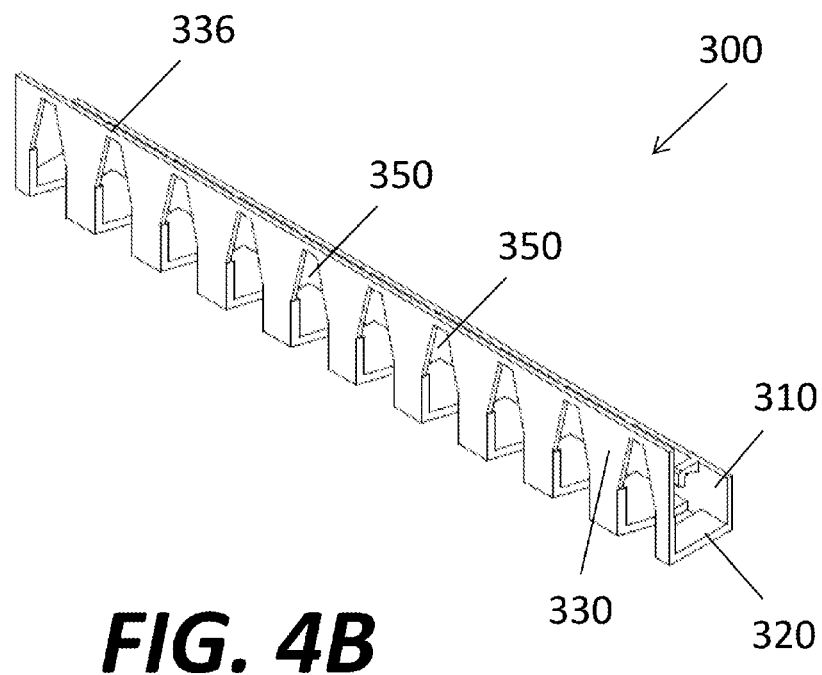
FIG. 4B is a rear perspective view of the cable guide of FIG. 4A.
Figure 5A:
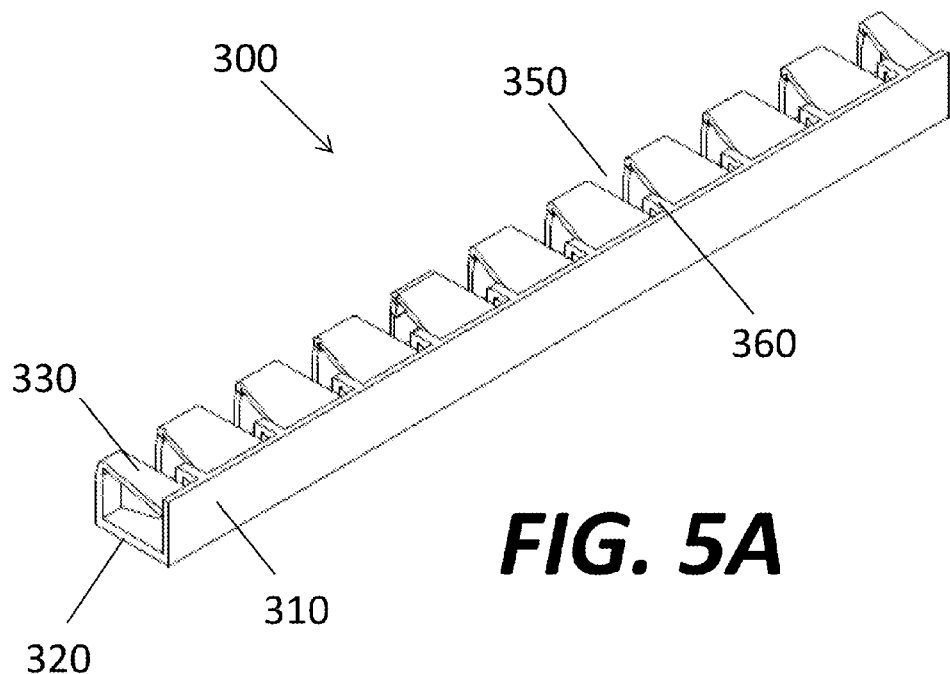
FIG. 5A is front perspective view of the cable guide of FIG. 4A in a closed condition.
Figure 5B:
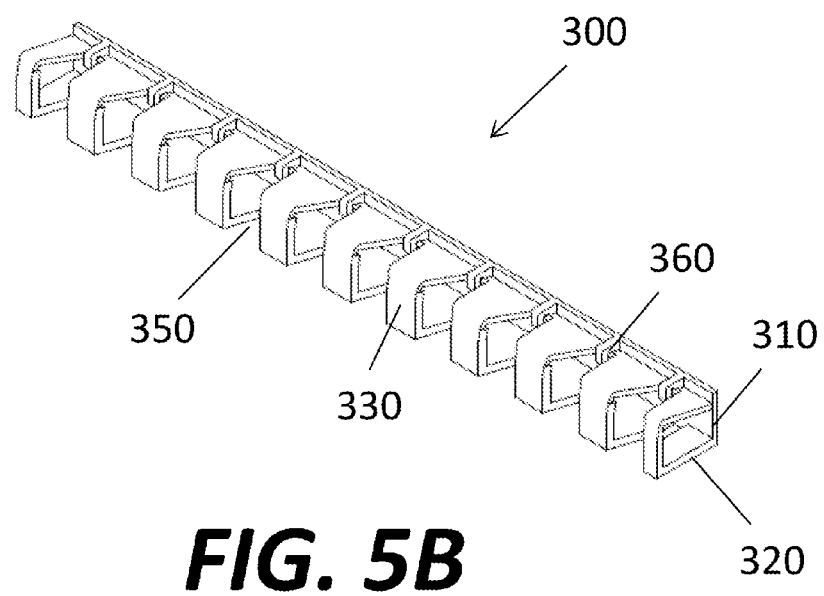
FIG. 5B is a rear perspective view of the cable guide of FIG. 5A.
Figure 5C:
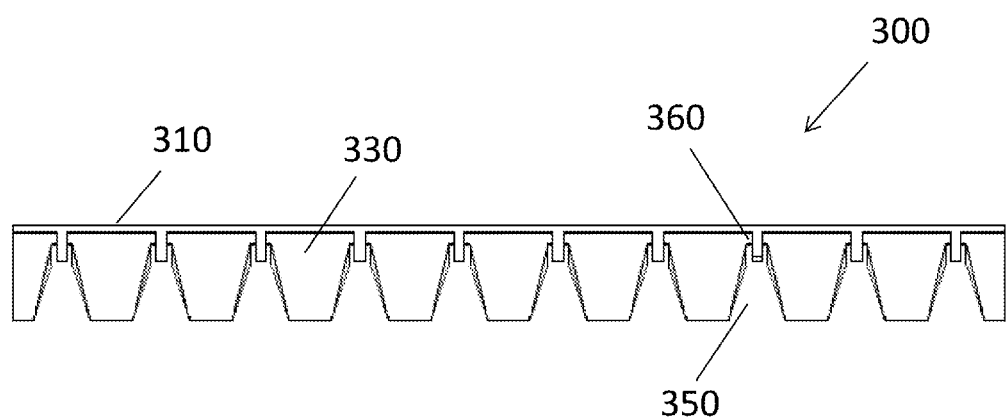
FIG. 5C is a top view of the cable guide of FIG. 5A.
Figure 5D:
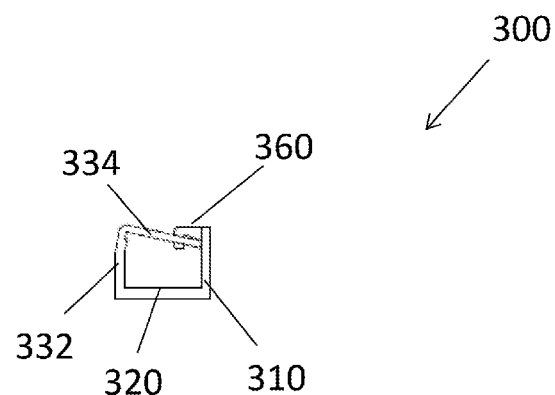
FIG. 5D is a side view of the cable guide of FIG. 5A.

As noted above, third wall 330 may be resilient and configured to bend at the transition between first portion 332 and second portion 334. As second portion 334 bends toward first wall (clockwise as shown in the view of FIG. 4D), second portion 334 contacts hook 360, causing hook 360 to deflect as second portion 334 continues bending beyond hook 360. In the illustrated embodiment, each hook 360 generally aligns with a center portion of a cutout 350 defined by third wall 330. Thus, once second portion 334 of third wall 330 is bent clockwise beyond hooks 360, and force is released, second portion 334 tends to bend counterclockwise to revert to its original, normal position. However, hooks 360 engage lips 336 adjacent cutouts 350, stopping any further tendency of the second portion 334 of third wall 330 to continue counterclockwise reversion to the initial position. Cable guide 300 is shown in this closed condition in FIGS. 5A-D, which correspond to the views shown in FIGS. 4A-D. In the closed condition, the channel extending along the longitudinal axis of guide 300 becomes substantially enclosed by first wall 310, second wall 320, first portion 332 of third wall 330, and second portion 334 of third wall 330, with the interaction of lips 336 and hooks 360 locking the guide in the closed condition. As described above, hooks 360 may be formed of a flexible, resilient material such that the hooks 360 deflect to allow the transition of guide from the open condition to the closed condition, and further to allow automatic reversion back to the open condition when enough manual force is applied to lift second portion 334 of third wall 330 away from first wall 310.

Figure 6:
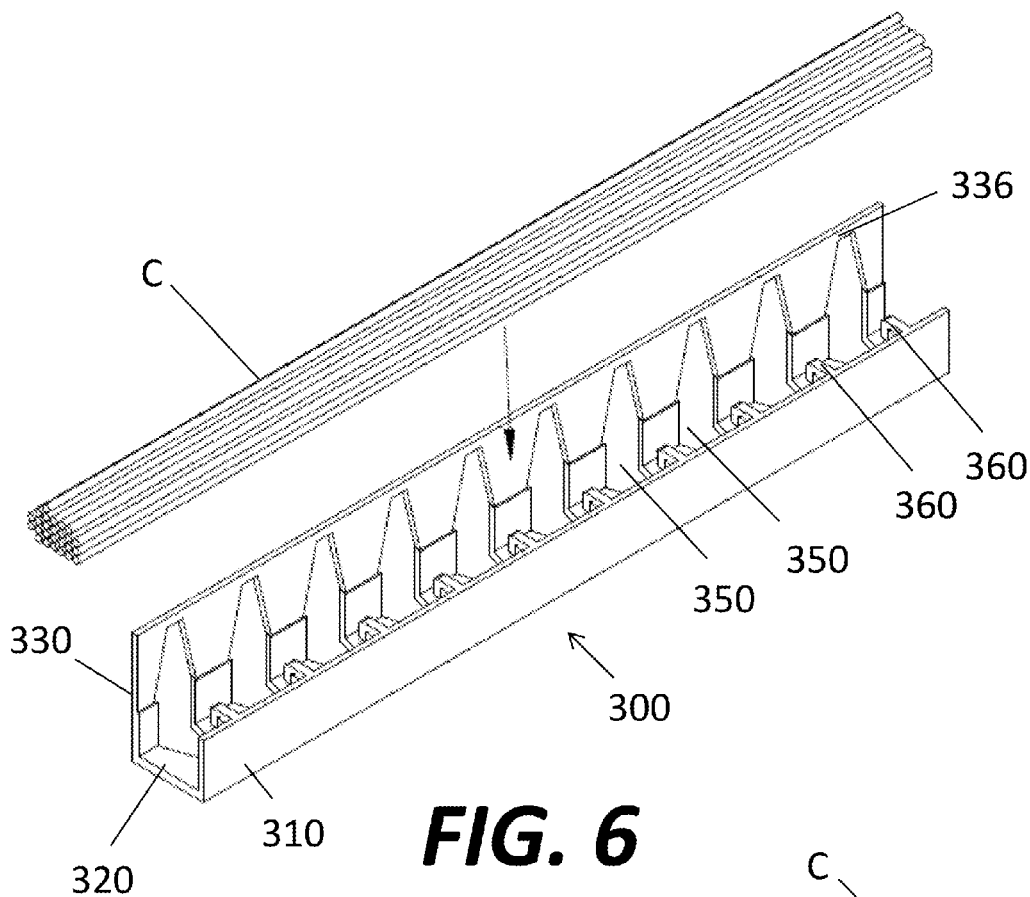
FIG. 6 is a front perspective view of the cable guide of FIG. 4A in an open condition with cables positioned adjacent to the cable guide.
Figure 7A:
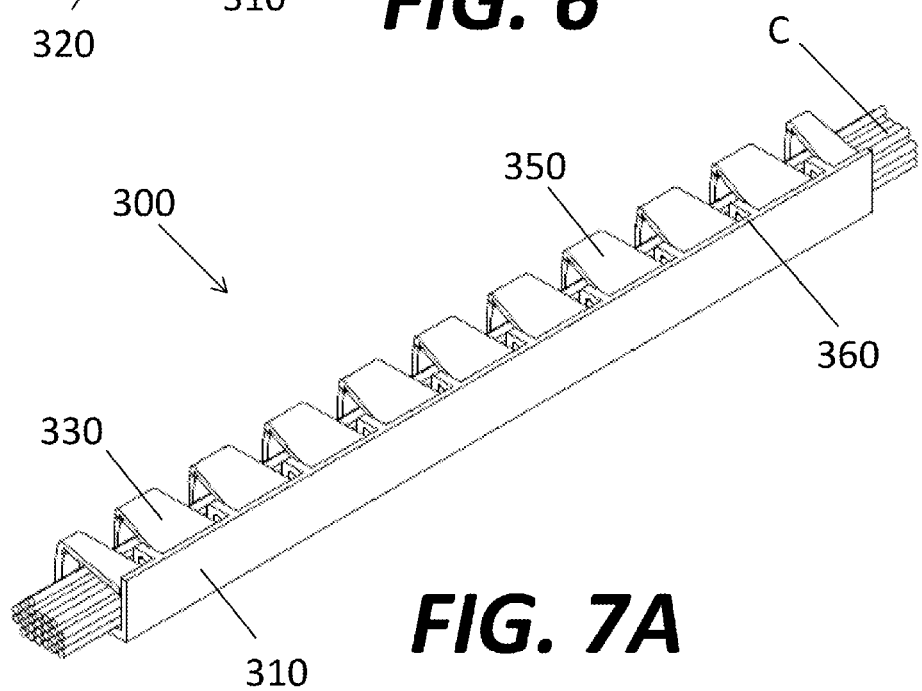
FIG. 7A is a front perspective view of the cable guide of FIG. 4A in the closed condition with cables secured therein.
Figure 7B:
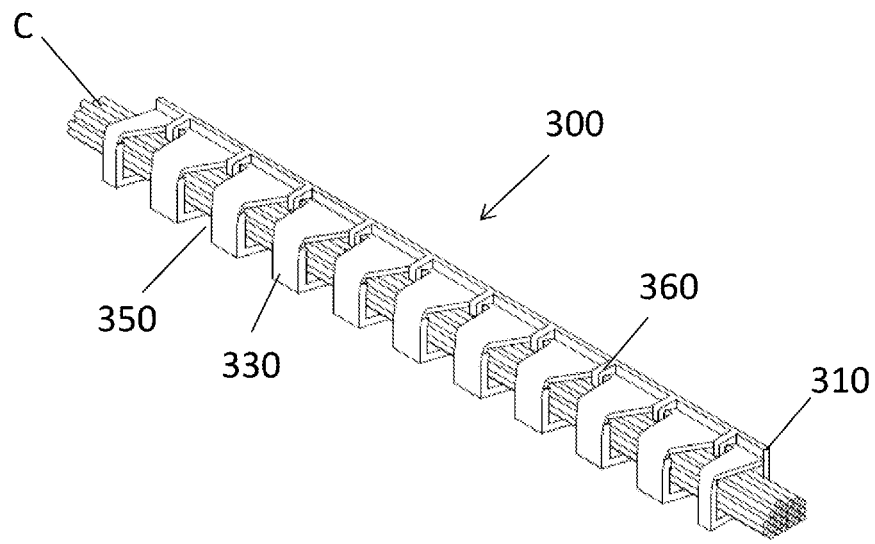
FIG. 7B is a rear perspective view of the cable guide of FIG. 4A in the closed condition with cables secured therein.
Figure 7C:
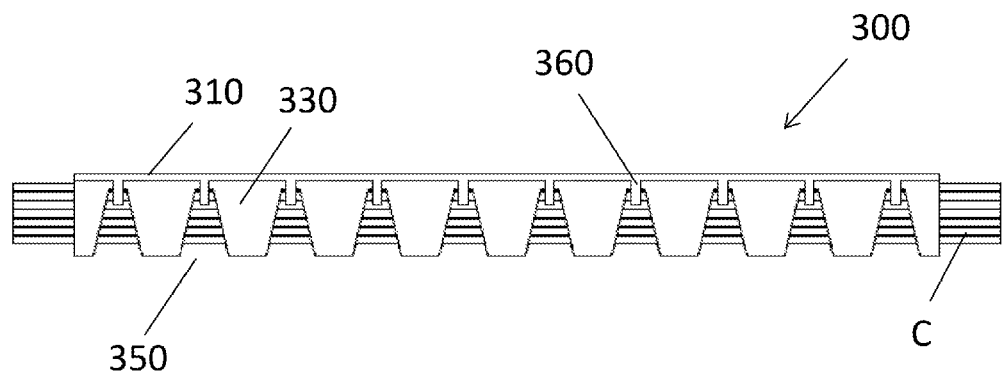
FIG. 7C is a top view of the cable guide of FIG. 4A in the closed condition with cables secured therein.

FIG. 6 shows cable guide 300 in the open condition, illustrating that a cable C or bundle of cables C may be inserted into the channel of cable guide 300. The ability to insert one or more cables C into cable guide 300 from the top when cable guide 300 is in the open condition may provide benefits. For example, cable guide 300 may be pre-attached to a device, such as the housing 2 of patch panel system 200, so that cables C may be easily and quickly inserted into cable guide 300. One example of the attachment of a cable guide 300 to patch panel system 200 is described in greater detail below in connection with FIGS. 10A-B. This implementation may be particularly useful when a large number of cables is utilized in a small amount of space. Cable guide 300 is shown in the closed condition in FIGS. 7A-C, with a bundle of cables C situated in the channel of cable guide 300. The views of cable guide 300 in FIGS. 7A-C correspond with the views shown in FIGS. 5A-C.

In addition to providing for easy insertion, removal, and management of cables C, cable guide 300 may also limit bending of cables C during use. For example, as described above in connection with FIGS. 3A-B, during operation of a patch panel system 200, such as during pulling tray 231 out of housing 2, cables C may bend or otherwise move as other components of patch panel system 200 move. If cables C were enclosed in a cable management system in which the cables C were fixedly secured such that the cables may bend in any manner and without any limits on the angle of bending, the cables C could be damaged as the cables bending while being caused to move by operation of the management system remains. As noted above, the walls 310, 320, 330 of cable guide 300 may be formed of an elastic material so that the cable guide 300 may bend. In addition, the bending or flexing capability of the cable guide 300 may be increased, with range of motion limited to a desired amount, based on the cutouts 350.

Figure 8A:
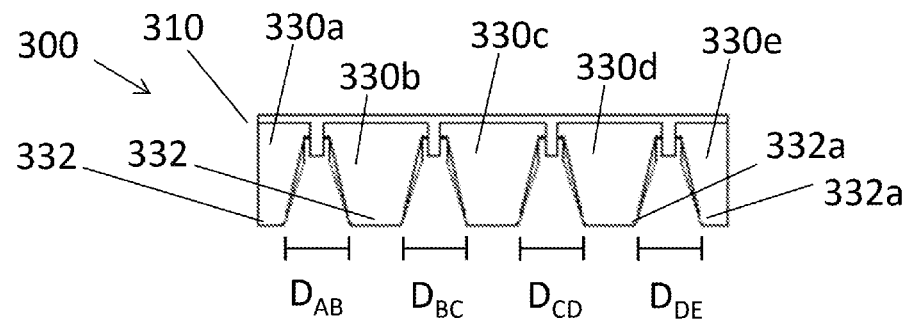
FIG. 8A is a top view of a portion of the cable guide of FIG. 4A in the closed condition.
Figure 8B:
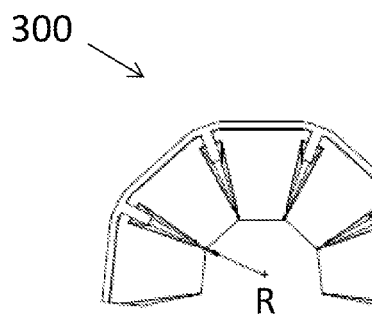
FIG. 8B is a top view of the portion of the cable guide of FIG. 8A in a bent condition.
Figure 8D:
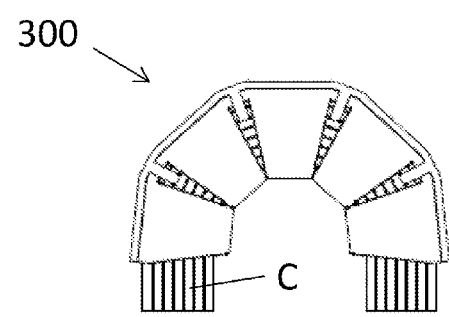
FIG. 8D is a top view of the portion of the cable guide of FIG. 8A in the bent condition with cables secured therein.
Figure 8C:
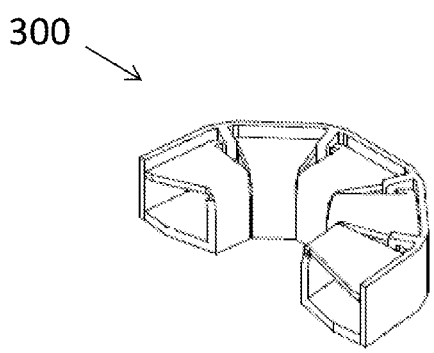
FIG. 8C is a perspective view of the portion of the cable guide of FIG. 8A in the bent condition.
Figure 8E:
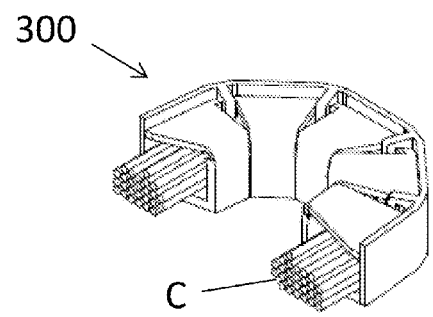
FIG. 8E is a perspective view of the portion of the cable guide of FIG. 8A in the bent condition with cables secured therein.

FIGS. 8A-E illustrate a portion of cable guide 300, showing in particular the capability of cable guide 300 to bend. FIG. 8A shows a top view of a portion of cable guide 300 in a closed, straightened condition, similar to FIG. 5C. Third wall 330 and cutouts 350, in combination with first wall 310 and second wall 320, may form a plurality of sequential enclosures 330*a*, 330*b*, 330*c*, 330*d*, and 330*e*. The space between adjacent enclosures 330*a* and 330*b*, at the portions 332, may have a distance $D_{AB}$. The cutout 350 between each pair of adjacent enclosures may each define an equal distance, including distances $D_{BC}$, $D_{CD}$, and $D_{DE}$, although the distances may be different in certain embodiments. As cable guide 330 begins to bend in the direction shown in FIGS. 8B-8E, the edges 332*a* of adjacent enclosures 330*a*, 300*b* at the wall 330, such as at the portions 332, move toward one another and distance $D_{AB}$ shrinks to zero as the edges 332A meet. Once distance $D_{AB}$ is zero, enclosure 330*a* is at a maximum level of bending or curvature with respect to adjacent enclosure 330*b*. Thus, because the size of the cutouts 350 determine the spacing between adjacent enclosures, the size of the cutouts 350 also determine the maximum degree to which one enclosure may bend with respect to an adjacent disclosure. As best illustrated in FIGS. 8B-E, dimensions of cutouts 350 also define, at least in part, a minimum bending radius R for cable guide 300, as well as any cables C that are secured within cable guide 300. Controlling the minimum bending radius R may help avoid cables C being damaged from being bent too much. In other words, forming one or more walls of cable guide 300 from elastic materials and providing cutouts 350 in third wall 330 both enhance the capability of cable guide 350 to bend. On the other hand, the dimensions of the cutouts 350 may desirably limit the degree to which cable guide 300 may bend, ensuring that cables C stored within cable guide 300 do not bend so much to damage the cables C. Although high bending of cables may cause various types of damage in various types of cables, in one particular example, high bending of an optical fiber may cause physical damage as well as inhibiting transmission of signals therethrough (known as bending loss).

Cable guide 300 may be utilized with patch panel systems in a variety of ways. For example, one or more cables C may be secured within cable guide 300 without coupling cable guide 300 to any components of the system. In another example, one or more cables C may be secured within cable guide 300 and some or all of cable guide 300 may be coupled to a stationary component of a patch panel system. In one particularly effective example, one portion of cable guide 300 may be pivotably coupled to a stationary portion of a patch panel system, such as by suitable pivotal coupling means as a rotatable pin 254*a*, and another portion of cable guide 300 may be pivotably coupled to a movable portion of the patch panel system, for example by a rotatable pin 252*a*.

Figure 9A:
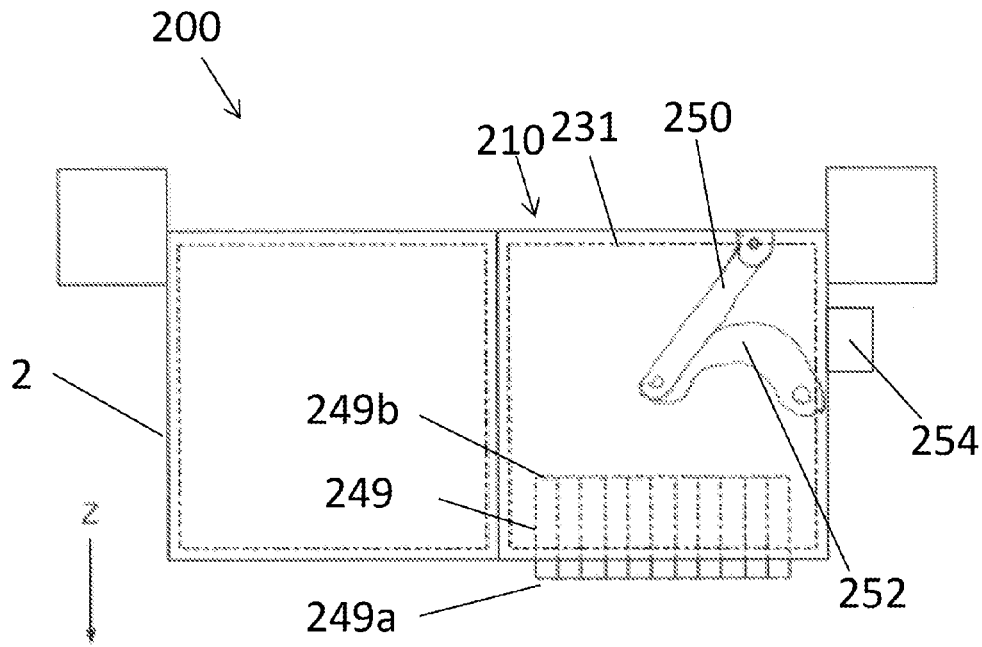
FIG. 9A is a top cutaway view of the patch panel system of FIG. 3A having additional components, with the tray in the closed position.
Figure 9B:
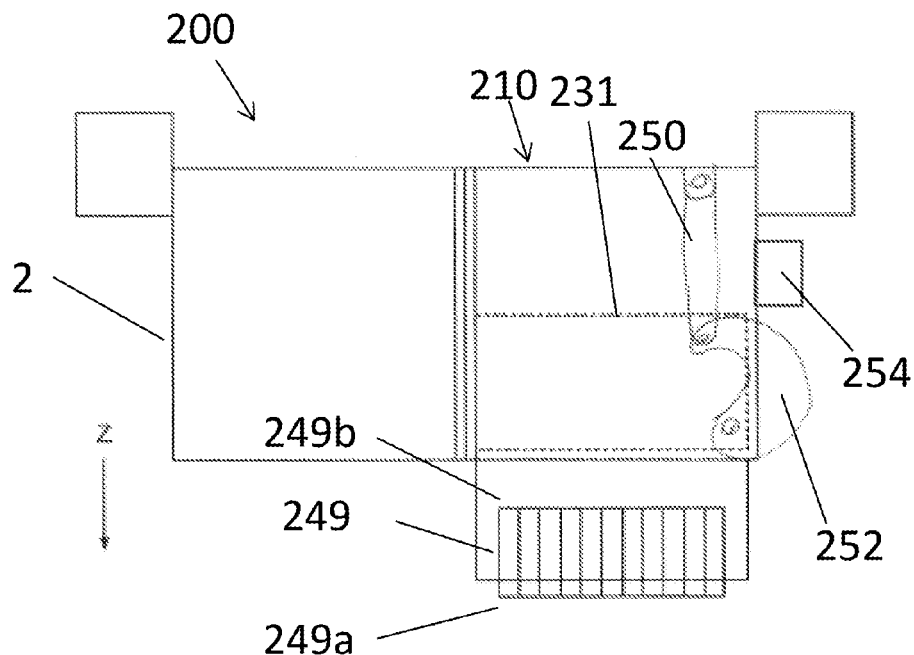
FIG. 9B is a top cutaway view of the patch panel system of FIG. 9A with the tray in the open position.

One example of a patch panel system 200 that may be used with one or more cable guides 300 is illustrated in FIGS. 9A-B. Patch panel system 200 is the same as shown in FIGS. 3A-B, with cables C omitted for clarity. Certain components are added to patch panel system 200, including a first link 250, a second link 252, and a fixed platform 254. First link 250 is pivotably coupled to a bracket on housing 2 at its first end, and is pivotably coupled to the second link 252 at the opposite end. Second link 252 is pivotably coupled to first link 250 at its first end, and is pivotably coupled to a portion of tray 231 and its second end. With this configuration, as tray 231 is pulled out, second link 252 swings clockwise (with reference to FIG. 9A) as the tray is moved from the pushed in condition in FIG. 9A to the pulled out condition in FIG. 9B. Fixed platform 254 may be an extension of housing 2.

Figure 10A:
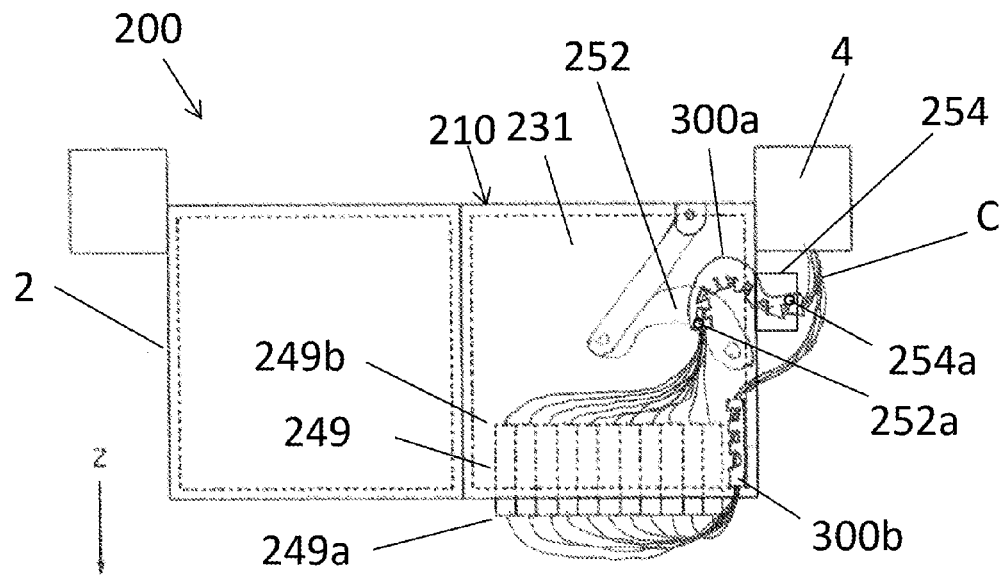
FIG. 10A is a top cutaway view of the patch panel system of FIG. 9A with cables secured in cable guides, with the tray in the closed position.
Figure 10B:
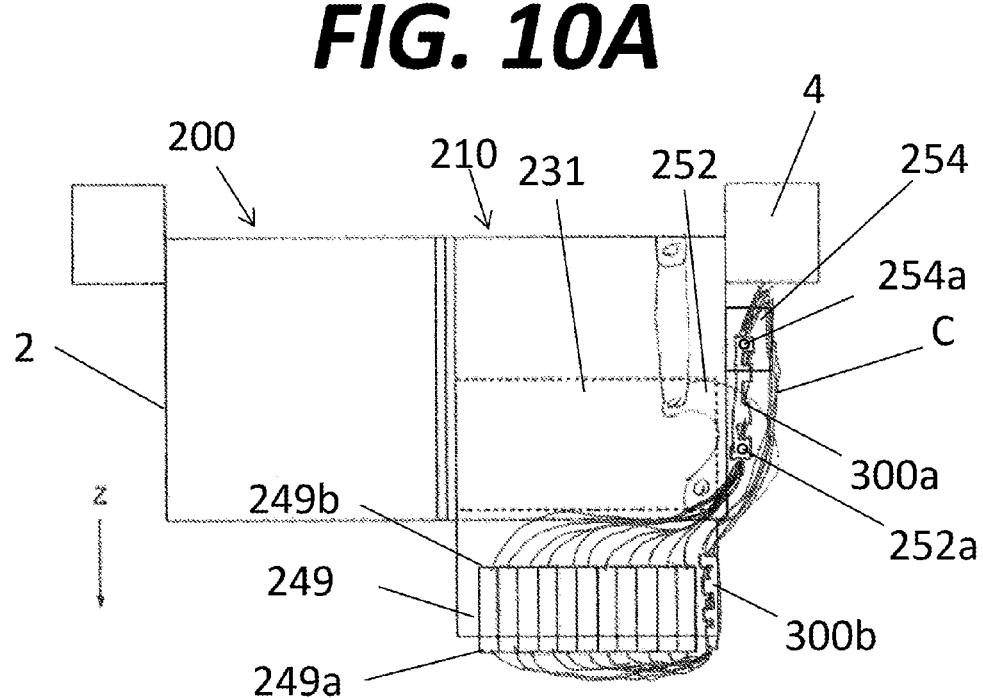
FIG. 10B is a top cutaway view of the patch panel system of FIG. 10A with cables secured in cable guides, with the tray in the open position.

FIGS. 10A-B illustrate the patch panel system 200 of FIGS. 9A-B with cables C illustrated and two identical cable guides 300*a*, 300*b* coupled to patch panel system 200. The first cable guide 300*a* has a first end coupled to fixed platform 254 and a second end coupled to second link 252. Cables C connected to the back surfaces 249*b* of connectors 249 are secured within first cable guide 300*a* and pass into rack pole 4. The second cable guide 300*b* is fixed to a portion of tray 231. Cables C connected to the front surfaces 249*a* of connectors 249 are secured within second cable guide 300*b* and pass into rack pole 4. When the tray 231 is in the pushed in condition (FIG. 10A), second link 252 is relatively close to fixed platform 254, causing first cable guide 300*a* to bend, similar to the illustration of FIGS. 8D-E. When the tray 231 is in the pulled out condition (FIG. 10B), second link 252 moves relative to fixed platform 254, causing first cable guide 300*a* to extend to a substantially straight condition. As tray 231 moves into or out of housing 2, cables C secured within first cable guide 300*a* remain organized in a desired way and bend no more than the minimum bending radius permitted by first cable guide 300*a*. Since second cable guide 300*b* is fixed only to tray 231, cable guide 300*b* does not change shape significantly as tray 231 is moved. As should be understood, cable guide 300 may be attached at different points in a system to achieve a desired result. For example, cable guide 300*a* could be attached to other moving parts of the system 200, such as directly to tray 231. In fact, first link 250 and second link 252 may be excluded from the system.

A cable guide assembly 400 is illustrated in FIGS. 11A-E according to another aspect of the disclosure. Cable guide assembly 400 may effectively be two cable guides 400*a*, 400*b* coupled together. Cable guides 400*a* and 400*b* may be substantially similar or identical to one another, and substantially similar or identical to cable guide 300. For example, cable guide 400*a* may include a first wall 410*a*, a second wall 420*a*, and a third wall 430*a*, and cable guide 400*b* may similarly include a first wall 410*b*, a second wall 420*b*, and a third wall 430*b*. Cable guide assembly 400 may comprise two individual cable guides 400*a*, 400*b* coupled together, for example by adhesives, at the first walls 410*a*, 410*b*. Alternatively, cable guide assembly 400 may be an integral unit, for example where first walls 410*a* and 410*b* are integral with one another.

Figure 11A:
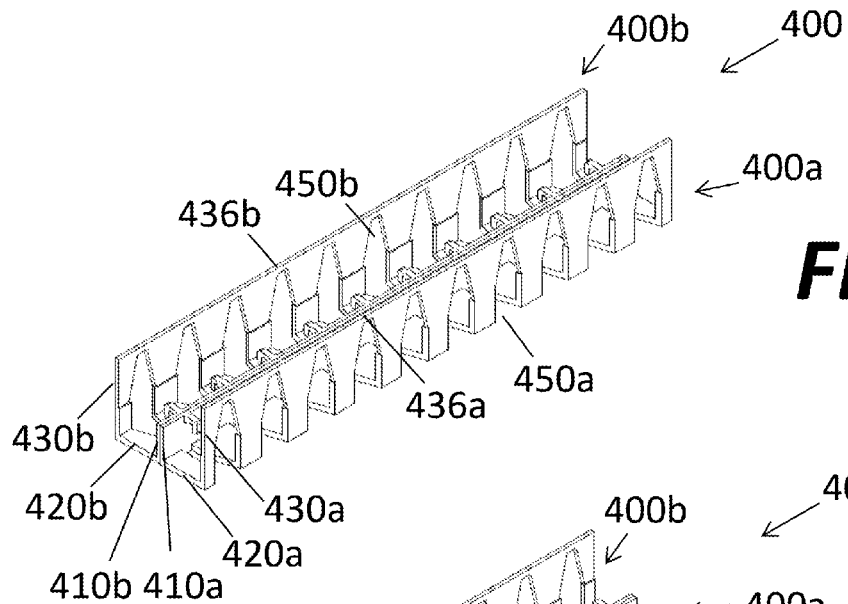
FIG. 11A is a perspective view of another embodiment of a cable guide in an open condition.
Figure 11B:
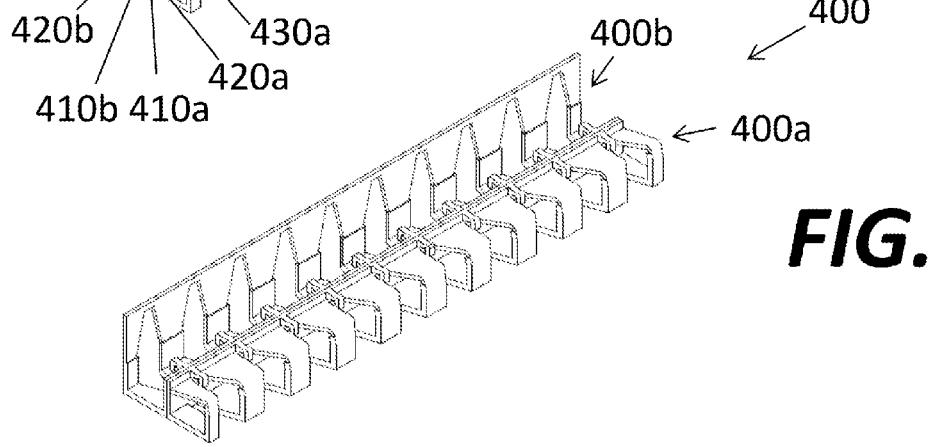
FIG. 11B is a perspective view of the cable guide of FIG. 11A in a partially closed condition.
Figure 11C:
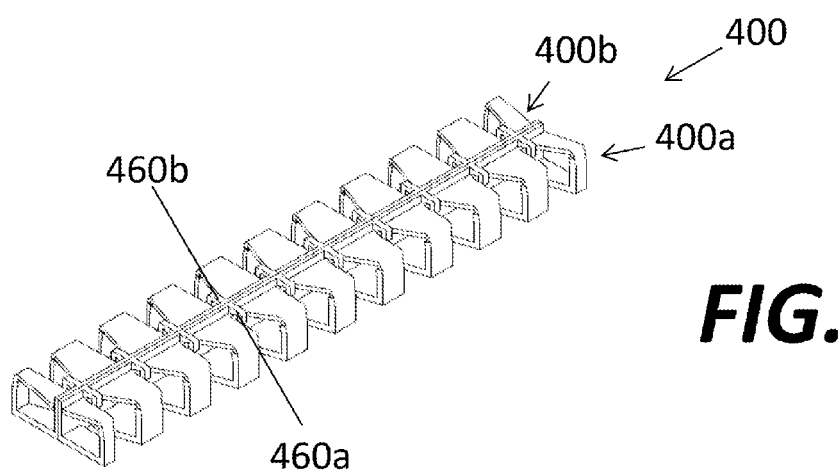
FIG. 11C is a perspective view of the cable guide of FIG. 11A in a fully closed condition.
Figure 11D:
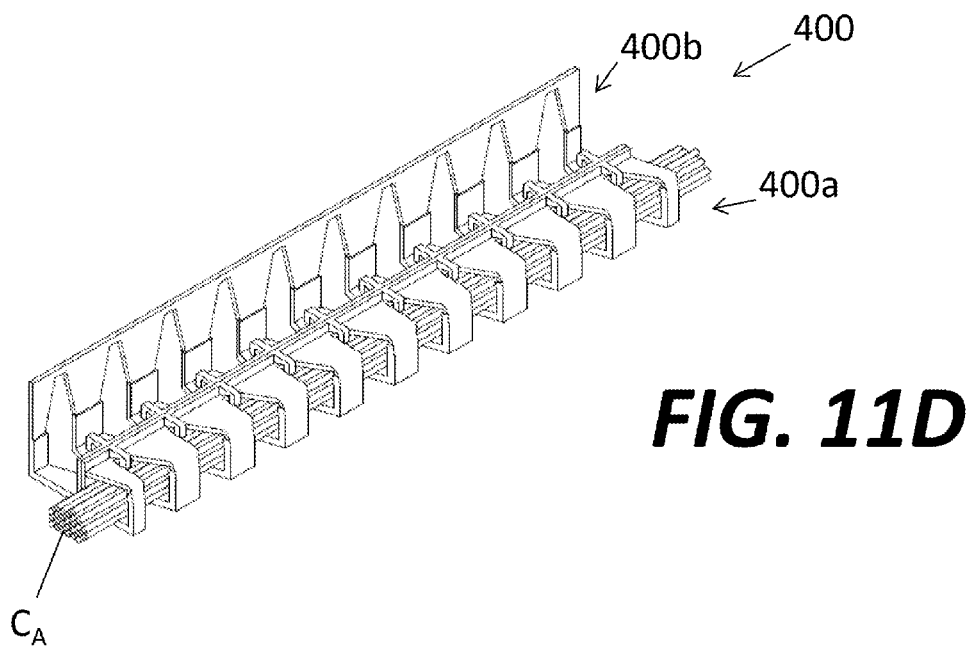
FIG. 11D is a perspective view of the cable guide of FIG. 11A in a partially closed condition with one bundle of cables secured therein.
Figure 11E:
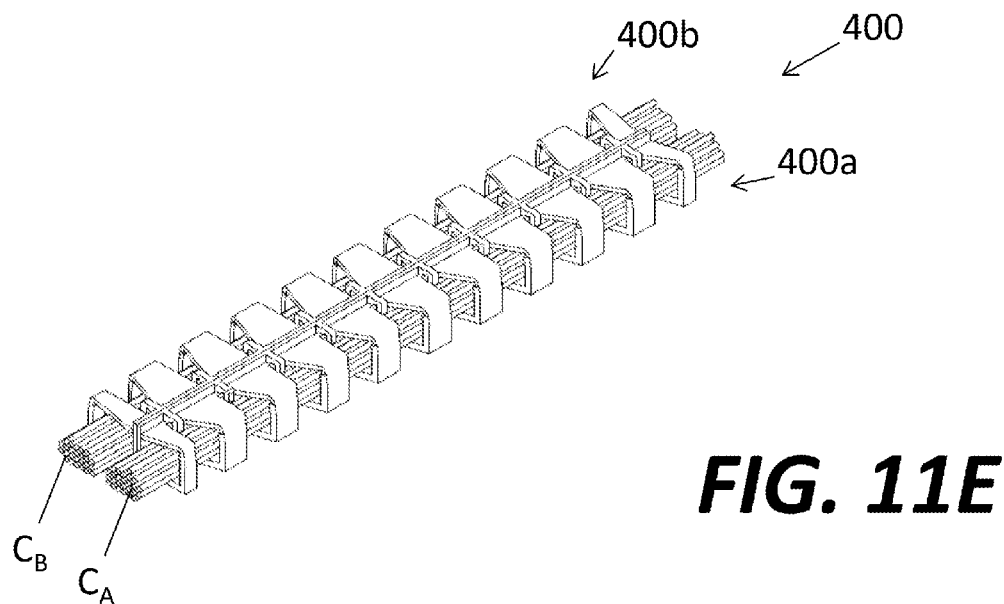
FIG. 11E is a perspective view of the cable guide of FIG. 11A in a fully closed condition with two bundles of cables secured therein.
Figure 12A:
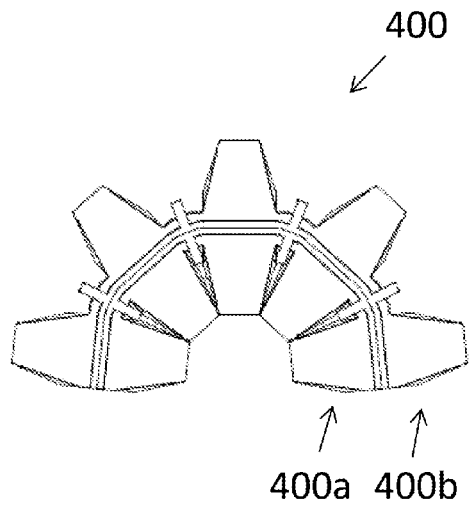
FIG. 12A is a top view of a portion of the cable guide assembly of FIG. 11A in a bent condition.
Figure 12C:
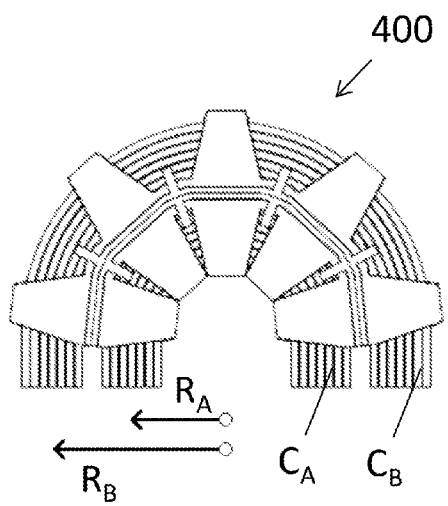
FIG. 12C is a top view of the portion of the cable guide assembly of FIG. 12A in the bent condition with cables secured therein.
Figure 12B:
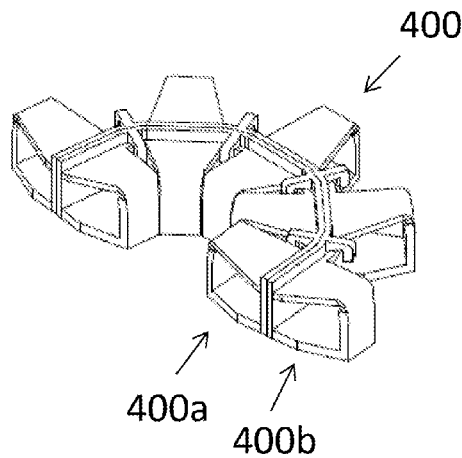
FIG. 12B is a perspective view of the portion of the cable guide assembly of FIG. 12A in the bent condition.
Figure 12D:
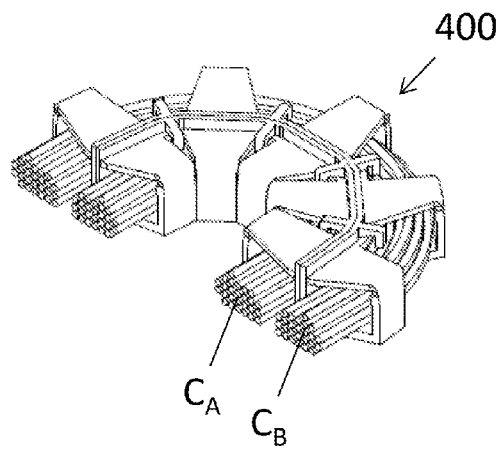
FIG. 12D is a perspective view of the portion of the cable guide assembly of FIG. 12A in the bent condition with cables secured therein.

Cable guides 400*a* and 400*b* of cable guide assembly 400 may work in a similar manner as cable guide 300. For example, cable guide assembly 400 may be attached to a patch panel system 200. Cable guide assembly 400 is shown in FIG. 11A in an open condition, with both cable guides 400a and 400b in the open condition. As shown in FIGS. 11B-C, one or both cable guides 400a, 400b may be transitioned to a closed condition by applying sufficient force to the third wall 430a and/or 430b to cause them to move beyond respective hooks 460a and/or 460b. As with cable guide 300, lip 436a may engage hook 460a to keep cable guide 400a in the closed condition, and lip 436b may engage hook 460b to keep cable guide 400b in the closed condition. As shown in FIGS. 11D-E, cable guides 400a and 400b of cable guide assembly 400 may secure two separate cables or bundles of cables $C_A$, $C_B$, respectively.

FIGS. 12A-E illustrate a portion of cable guide assembly 400 in the bent condition, similar to cable guide 300 shown in FIGS. 8B-E. Cable guide 400a is bent in a substantially similar manner to cable guide 300 of FIGS. 8B-E. In the illustrated bent condition, cables $C_A$, secured within cable guide 400a, have at least a bending radius $R_A$, which is a minimum bending radius that avoids damage to the cables when bent. Cable guide 400b, with cable $C_B$ secured therein, is simultaneously bent with each cable $C_B$ having at least a bending radius $R_B$. When bent as illustrated, minimum bending radius $R_A$ is smaller than the bending radius $R_B$. However, it should be understood that cable guide assembly 400 may be bent in substantially the opposite direction shown in FIGS. 12A-D, such that the bending radius of cable $C_A$ is greater than the bending radius of cable $C_B$, where the minimum bending radius for the cables $C_B$ would be a radius that avoids damage to the cables when bent.

Figure 13A:
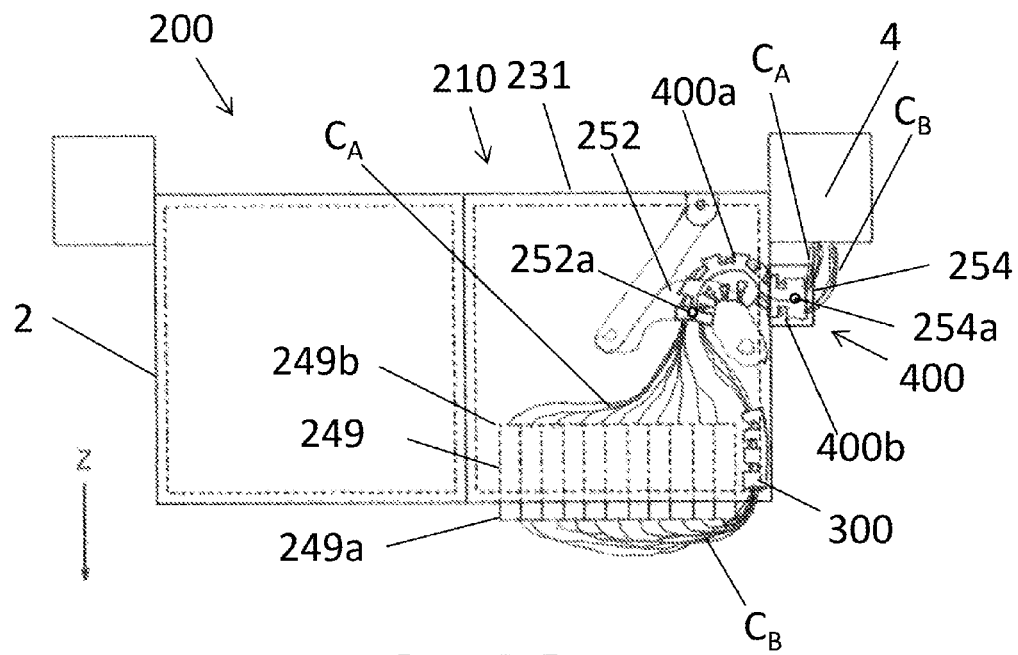
FIG. 13A is a top cutaway view of the patch panel system of FIG. 9A with cables secured in various cable guides, with the tray in the closed position.
Figure 13B:
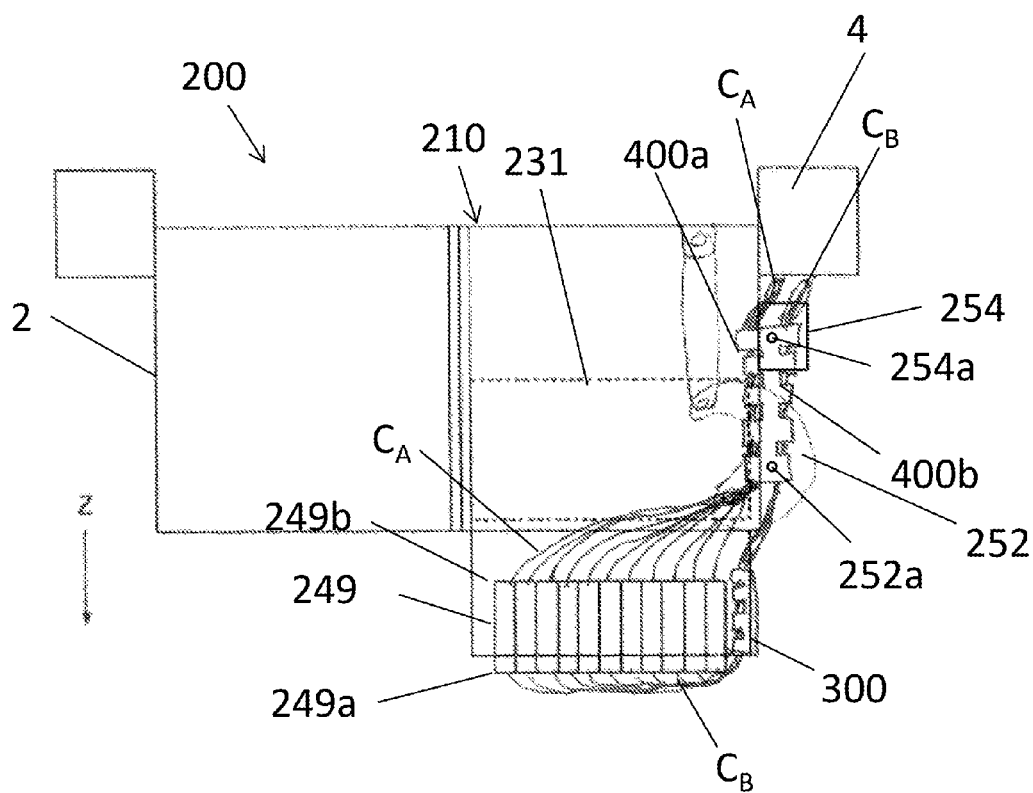
FIG. 13B is a top cutaway view of the patch panel system of FIG. 13A with cables secured in various cable guides, with the tray in the open position.

Cable guide assembly 400 may be particularly useful in systems in which two separate cables or bundles of cables are routed along a similar pathway. For example, FIGS. 13A-B illustrate the patch panel system 200 of FIGS. 9A-B with two bundles of cables $C_A$, $C_B$ illustrated and with cable guide assembly 400 and cable guide 300 in use with patch panel system 200. Cable guide assembly 400 has a first end coupled to fixed platform 254 and a second end coupled to second link 252. The first bundle of cables $C_A$ is connected to the back surfaces 249b of connectors 249 and is secured within cable guide 400a of cable guide assembly 400 and passes into rack pole 4. Cable guide 300 is fixed to a portion of tray 231. The second bundle of cables $C_B$ is connected to the front surfaces 249a of connectors 249. A first portion of cables $C_B$ is secured within cable guide 300 and a second portion of cables $C_B$ is secured within cable guide 400b of cable guide assembly 400, with cables $C_B$ passing into rack pole 4. As tray 231 transitions between the pushed in condition and the pulled out condition, cable guide assembly 400 (including cable guides 400a and 400b) transitions from a bent position similar to that shown in FIG. 12A to a straightened position similar to that shown in FIG. 11C. This configuration is similar to that shown in FIGS. 10A-B, but the use of cable guide assembly 400 provides for a second area for securing cables $C_B$ to patch panel system 200. This configuration may provide even better cable organization and management, with many or all of the same benefits of the system shown in FIGS. 10A-B, for example including easy access to cables and maintaining a minimum bending radius for the cables secured within the guides.

Figure 14A:
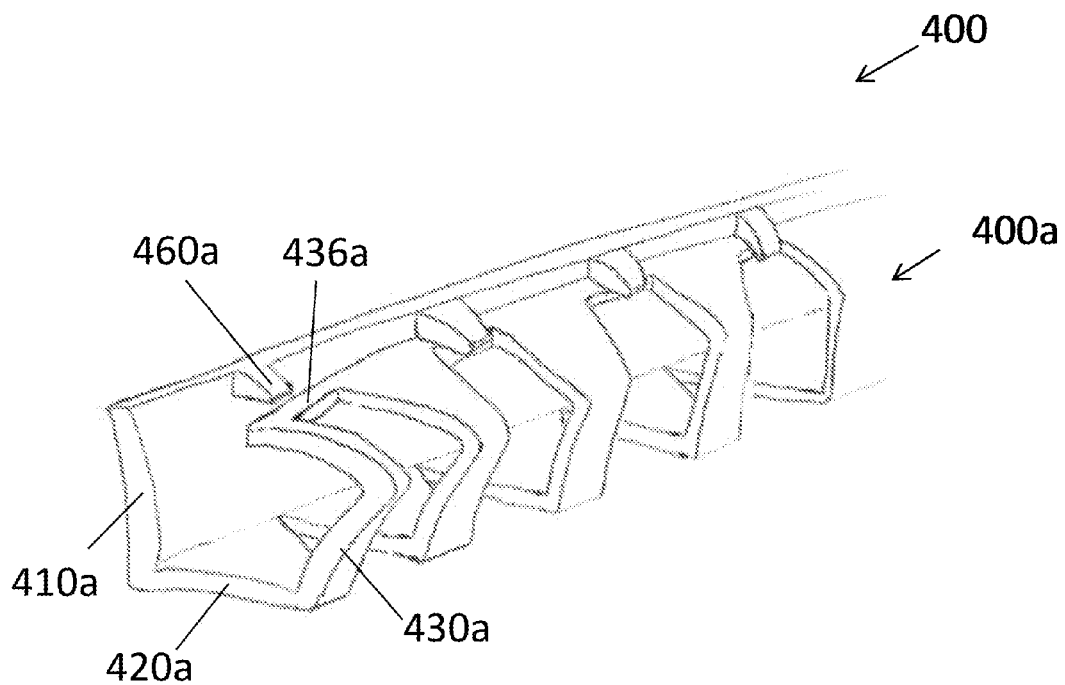
FIG. 14A is a perspective view of one end of a portion of the cable guide assembly of FIG. 11A during use.
Figure 14B:
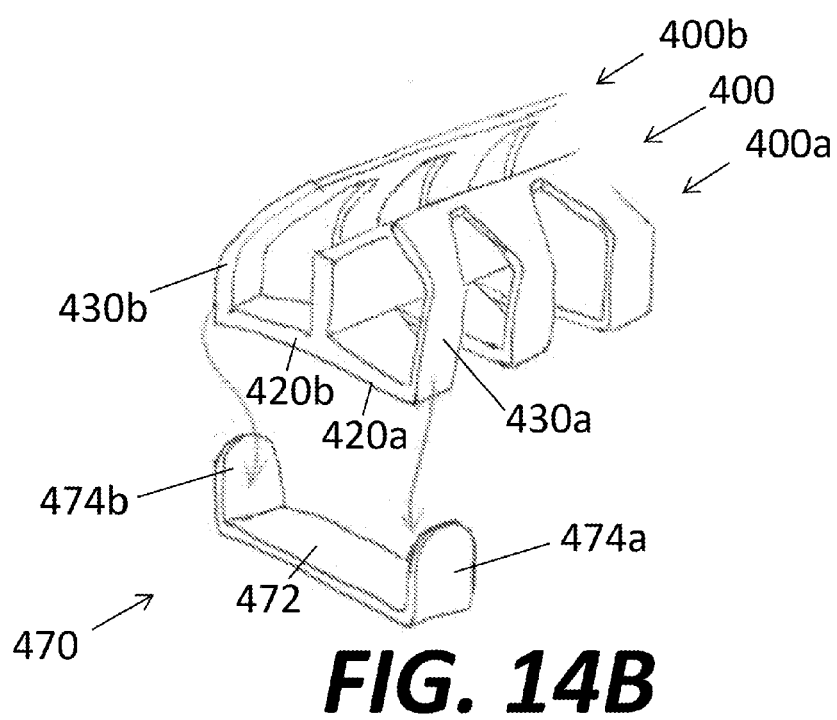
FIG. 14B is a perspective view of one end of the cable guide assembly of FIG. 11A with a reinforcement member.

When cable guide assembly 400 is in use, particularly when cables secured therein bend to a significant degree, a greater amount of stress may be put on an end portion of the guide assembly 400 than middle portions. This potential effect is illustrated in FIG. 14A, which shows a portion of cable guide 400a and omits for clarity cable guide 400b and all cables secured within cable guide assembly 400. In particular, if cables secured within cable guide 400a are bent to the right (with reference to the view as shown in FIG. 14A), the far end of third wall 430a and the associated lip 436a may tend to pull away from the associated hook 460 and become disengaged. To reduce the potential of such disengagement, a reinforcement member 470 may be used in conjunction with cabled guide assembly 400. As shown in FIG. 14B, reinforcement member 470 may comprise lateral bridge 472 with two protruding members 474a, 474b extending substantially orthogonally from opposing ends of bridge 472. Some or all of reinforcement member 470 is preferably more rigid than the flexible second walls 420a, 420b and third walls 430a, 430c of cable guide assembly 400. The increased rigidity may be a result of material choice, thickness, and/or design of reinforcement member 470. When reinforcement member 470 is coupled to cable guide assembly 400, bridge 472 preferably extends along and contacts second walls 420a, 420b while protrusion 474a extends along and contacts a portion of third wall 430a and protrusion 474b extends along and contacts a portion of third wall 430b. Reinforcement member 470, when coupled to cable guide assembly 400, may avoid the likelihood of the end portions of cable guides 400a and 400b from opening when under stress caused by bending cables. Reinforcement member 470 may be dimensioned so that it may snap-fit or otherwise frictionally engage with the ends of cable guides 400a, 400b. Alternately, reinforcement member 470 may be adhesively or otherwise coupled to one or both ends of cable guide assembly 400. Although a single reinforcement member 470 on each end of cable guide assembly 400 may be sufficient to keep cable guides 400a and 400b in the closed condition when stressed by bending cables, additional reinforcement members 470 may be coupled to cable guide assembly 400 for additional reinforcement. It should also be understood that reinforcement 470 need not be a separate add-on structure. For example, cable guide assembly 400 may be designed so that the material properties of the various walls are heterogeneous such that end portions are more rigid than intermediate portions. Finally, it should be understood that similar reinforcement structures may be used for similar reasons in connection with cable guide 300 and other embodiments of cable guides described herein.

Figure 15A:
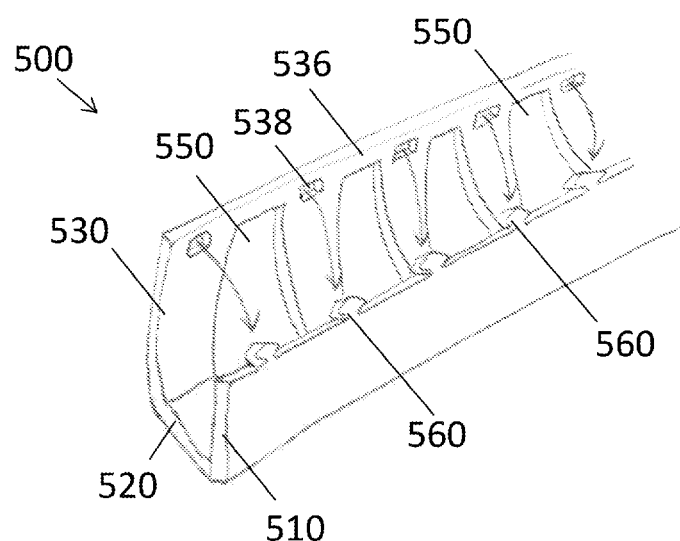
FIG. 15A is a perspective view of a portion of a cable guide in an open condition according to another aspect of the disclosure.
Figure 15B:
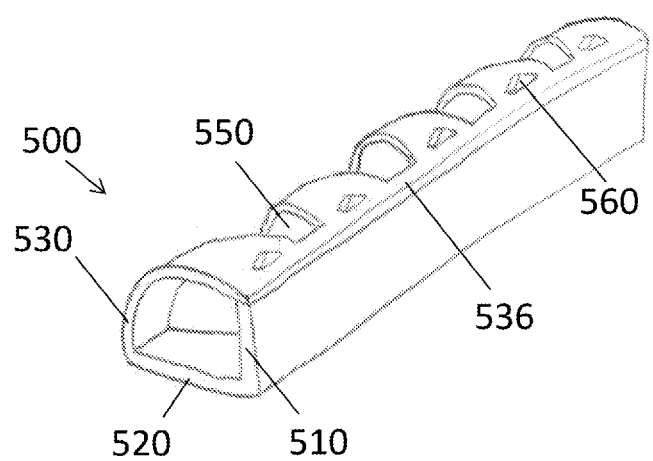
FIG. 15B is a perspective view of the cable guide of FIG. 15A in a closed condition.
Figure 15C:
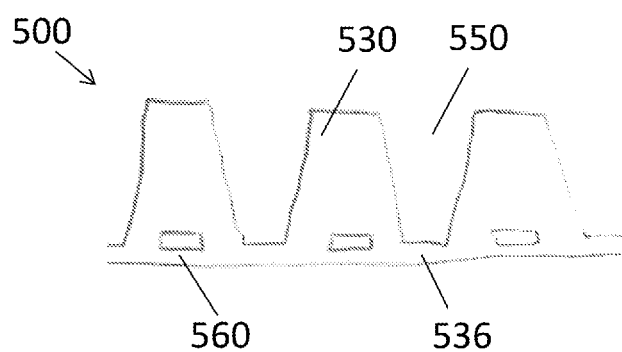
FIG. 15C is a top view of the cable guide of FIG. 15A in the closed condition.

Although various cable guides and schemes for attaching cable guides to systems have been described above, it should be understood that alternative structures and attachment schemes may be used without departing from the inventive concept. For example, although cable guide 300 and cable guide assembly 400 are described with a hook and lip type closure, other closure mechanisms may be suitable. In one particular example, a cable guide identical to cable guide 300 may be used, with the position of the hook and lip reversed, such as with a series of loops (instead of hooks) extending from a first wall, and a series of corresponding hooks extending from a third wall. Still other closure mechanisms may be suitable. For example, FIGS. 15A-C illustrate a cable guide 500 similar to cable guide 300 with an alternative latching mechanism. Like cable guide 300, cable guide 500 may include a first wall 510, a second wall 520, and a third wall 530. The third wall 530 may define a number of cutouts 550 and lips 536. Instead of hooks, first wall 510 includes flexible protruding members with a first smaller width and a second larger width. As third wall 530 bends toward first wall 510 to transition cable guide 500 to a closed condition, a series of apertures 538 in the wall 530 engages the corresponding series of protrusions 560. Each aperture 538 has an opening dimension smaller than the larger width of protrusions 560. Because protrusions 560 are flexible, the application of closing force on third wall 530 toward first wall 510 deforms protrusions 560 enough such that the protrusions 560 pass through corresponding apertures 538, as shown in FIG. 15B. As with other closure mechanisms described herein, the material properties and dimensions of the closure mechanism are preferably chosen so that cable guide 500 may be transitioned from the open condition to the closed condition, and vice versa, upon deliberate application of manual force, while maintaining the closed condition during normal operating conditions including bending of cable guide 500 and any cables secured therein.

Figure 16A:
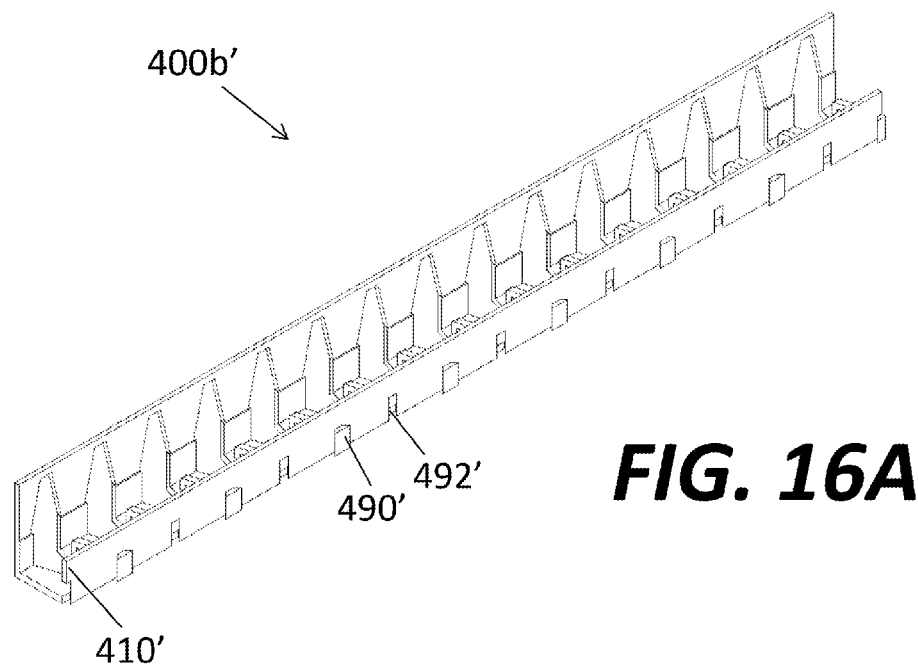
FIG. 16A is a perspective view of one cable guide apparatus of a cable guide assembly in an open condition.
Figure 16B:
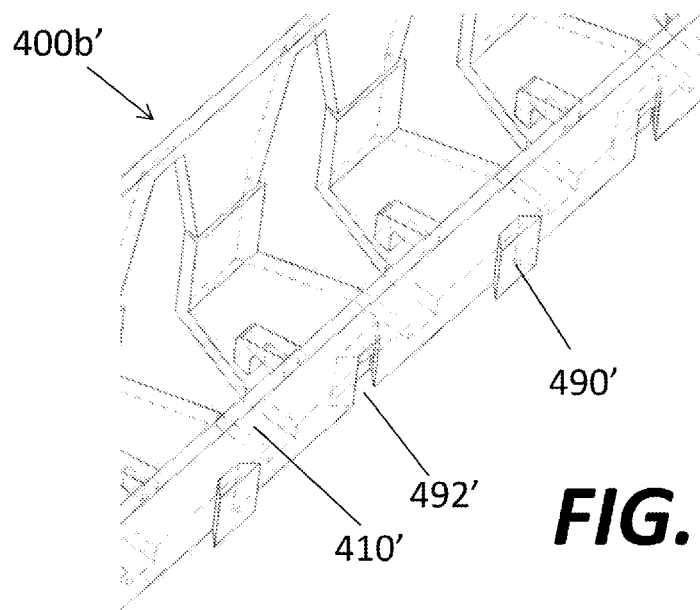
FIG. 16B is an enlarged view of the cable guide apparatus of FIG. 16A.

FIGS. 16A-B illustrate an alternate embodiment of cable guide apparatus 400b' of a cable guide assembly. Cable guide 400b' may be identical in all respects to cable guide 400b with the exception of connection features for connecting cable guide apparatus 400b' to an identical cable guide apparatus to assembly a cable guide assembly similar to cable guide assembly 400. In the illustrated embodiment, cable guide 400b' includes protrusions 490' extending from the first wall 410' and recesses 492' in the first wall 410'. The connection features may alternate so that one protrusion 490' is on each side of a recess 492', and one recess 492' is on each side of a protrusion 490', with the exception of connection features at each end of the cable guide apparatus 400b'. In the illustrated embodiment, protrusion feature 490' is generally in the shape of a pyramid (or a truncated pyramid). Recess 492' may be in a corresponding shape so that a protrusion 490' of cable guide apparatus 400b' may slide into a recess of a second cable guide apparatus (not shown). With this configuration, cable guide apparatus 400b' may be used in its individual capacity, or two identical cable guide apparatus 400b' maybe connected via corresponding protrusions 490' and recesses 492' to form a cable guide assembly, similar to that shown in FIG. 11A, without the need for adhesives or other permanent connection.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. In addition, features of one embodiment may be combined with features of other embodiments without departing from the scope of the invention.

The invention claimed is:

1. A cable guide apparatus comprising:
    a first wall portion, a second wall portion, and a third wall portion defining a first longitudinal channel, the first and third wall portions being movable relative to each other, wherein the third wall portion defines a plurality of openings;
    a plurality of first closure mechanisms on the first wall portion; and
    a plurality of second closure mechanisms on the third wall portion corresponding to the plurality of first closure mechanisms on the first wall portion and configured to engage with the plurality of first closure mechanisms on the first wall portion;
    the cable guide apparatus having an open condition in which the plurality of first closure mechanisms are spaced apart from the plurality of second closure mechanisms, and a closed condition in which at least some of the plurality of first closure mechanisms engage at least some of the plurality of second closure mechanisms;
    wherein, in the closed condition, the channel is substantially circumferentially enclosed at a plurality of positions along a length of the first longitudinal channel, and in the open condition, the channel is substantially circumferentially open along the length of the first longitudinal channel
    wherein the first wall portion, second wall portion, and third wall portion are bendable such that the first longitudinal channel has a bending radius and the first longitudinal channel has a minimum bending radius defined at least in part by a width of the plurality of openings in the third wall portion.

2. The cable guide apparatus of claim 1, wherein the first wall portion is substantially orthogonal to the second wall portion, and the second wall portion is substantially orthogonal to the third wall portion.

3. The cable guide apparatus of claim 1, wherein the third wall portion includes a first portion thicker than a second portion thereof, and wherein the second portion is coupled to the first portion at a transition point of the third wall portion forming a hinge.

4. The cable guide apparatus of claim 1, wherein the plurality of openings extends from the third wall portion to the second wall portion.

5. The cable guide apparatus of claim 1, wherein the first closure mechanisms are hooks and the second closure mechanisms are lips of the third wall portion.

6. The cable guide apparatus of claim 1, wherein the first closure mechanisms are protrusions having a first width and second width larger than the first width, and the second closure mechanisms define apertures having a third width smaller than the second width.

7. A cable guide housing system comprising:
    a housing;
    a tray moveably coupled to the housing; and
    the cable guide apparatus of claim 1, wherein a first end portion of the cable guide apparatus is coupled to a static or movable portion of the system and a second end portion of the cable guide apparatus is coupled to a portion of the movable tray.

8. The cable guide housing system of claim 7, wherein the bending radius of the cable guide apparatus changes as the tray moves with respect to the housing.

9. The cable guide housing system of claim 8, wherein the tray has a pushed in condition and a pulled out condition, the bending radius of the cable guide apparatus having a minimum value when the tray is in the pushed in condition.

10. A cable guide assembly comprising:
    a first cable guide apparatus comprising:
        a first wall portion, a second wall portion, and a third wall portion defining a first longitudinal channel, the first and third wall portions being movable relative to each other, wherein the third wall portion defines a plurality of openings;
        a plurality of first closure mechanisms on the first wall portion; and
        a plurality of second closure mechanisms on the third wall portion corresponding to the plurality of first closure mechanisms on the first wall portion and configured to engage with the plurality of first closure mechanisms on the first wall portion;
        the first cable guide apparatus having a first open condition in which the plurality of first closure mechanisms are spaced apart from the plurality of second closure mechanisms, and a first closed condition in which at least some of the plurality of first closure mechanisms engage at least some of the plurality of second closure mechanisms;

wherein, in the first closed condition, the channel is substantially circumferentially enclosed at a plurality of positions along a length of the first longitudinal channel, and in the first open condition, the first channel is substantially circumferentially open along the length of the first longitudinal channel; and a second cable guide apparatus comprising:
a fourth wall portion, a fifth wall portion, and a sixth wall portion defining a second longitudinal channel, the fourth and sixth wall portions being movable relative to each other, wherein the sixth wall portion defines a plurality of openings;
a plurality of third closure mechanisms on the fourth wall portion; and
a plurality of fourth closure mechanisms on the sixth wall portion corresponding to the plurality of third closure mechanisms on the fourth wall portion and configured to engage with the plurality of third closure mechanisms on the fourth wall portion;
the second cable guide apparatus having a second open condition in which the plurality of third closure mechanisms are spaced apart from the plurality of fourth closure mechanisms, and a second closed condition in which at least some of the plurality of third closure mechanisms engage at least some of the plurality of fourth closure mechanisms;
wherein, in the second closed condition, the second channel is substantially circumferentially enclosed at a plurality of positions along a length of the second longitudinal channel, and in the second open condition, the second channel is substantially circumferentially open along the length of the second longitudinal channel,
wherein the first wall portion, second wall portion, and third wall portion are bendable such that the first longitudinal channel has a bending radius, and the fourth wall portion, fifth wall portion, and sixth wall portion are bendable such that the second longitudinal channel has a bending radius, wherein the first longitudinal channel has a first minimum bending radius defined at least in part by a width of the plurality of openings in the third wall portion and the second longitudinal channel has a second minimum bending radius defined at least in part by a width of the plurality of openings in the sixth wall portion.

11. The cable guide assembly of claim 10, wherein the first wall portion of the first cable guide apparatus is coupled to the fourth wall portion of the second cable guide apparatus.

12. The cable guide assembly of claim 10, wherein the first wall portion of the first cable guide apparatus is integral with the fourth wall portion of the second cable guide apparatus.

13. The cable guide assembly of claim 10 wherein, when the first longitudinal channel is bent to the first minimum bending radius, the bending radius of the second longitudinal channel is greater than the first minimum bending radius.

14. The cable guide assembly of claim 10 wherein, when the second longitudinal channel is bent to the second minimum bending radius, the bending radius of the first longitudinal channel is greater than the second minimum bending radius.

15. A cable guide housing system comprising:
a housing;
a tray moveably coupled to the housing; and
the cable guide assembly of claim 10, wherein a first end portion of the cable assembly is coupled to a static or movable portion of the system and a second end portion of the cable guide assembly is coupled to a portion of the movable tray.

16. The cable guide housing system of claim 15, wherein as the tray moves with respect to the housing the first bending radius and second bending radius each change.

* * * * *